United States Patent
Shimizu et al.

(10) Patent No.: US 8,987,572 B2
(45) Date of Patent: Mar. 24, 2015

(54) SYSTEM AND METHOD FOR TEACHING AND TESTING MUSICAL PITCH

(71) Applicant: Generategy, Seattle, WA (US)

(72) Inventors: Hirofumi Shimizu, Seattle, WA (US); Paul T. Andronis, Marquette, MI (US); Melinda Sota, Seattle, WA (US); Nathan Rollins, Seattle, WA (US); Nattapong Thangvijit, Seattle, WA (US); Terrence Layng, Seattle, WA (US); Marta Leon, Seattle, WA (US); Jay Thompson, Seattle, WA (US); Nathan Skone, Seattle, WA (US)

(73) Assignee: Generategy LLC, Seattle, WA (US)

( * ) Notice: Subject to any disclaimer, the term of this patent is extended or adjusted under 35 U.S.C. 154(b) by 259 days.

(21) Appl. No.: 13/730,334

(22) Filed: Dec. 28, 2012

(65) Prior Publication Data

US 2013/0167707 A1    Jul. 4, 2013

Related U.S. Application Data

(60) Provisional application No. 61/581,561, filed on Dec. 29, 2011.

(51) Int. Cl.
G09B 15/00 (2006.01)
G09B 15/02 (2006.01)
G09B 15/04 (2006.01)

(52) U.S. Cl.
CPC ..................... *G09B 15/00* (2013.01)
USPC ......... 84/470 R; 84/477 R; 84/483.2; 84/609; 84/649

(58) Field of Classification Search
CPC .......... G09B 15/00; G09B 15/02; G09B 5/06; G10H 1/0008; G10H 2220/101; G10H 2220/135; G10H 1/368; G10H 2210/066; G10H 2210/081; G10H 1/18; G10H 2210/091; G10H 2210/145; G10H 2220/151; G10G 1/00
See application file for complete search history.

(56) References Cited

U.S. PATENT DOCUMENTS

| | | | |
|---|---|---|---|
| 4,370,069 A | 1/1983 | Nomura | |
| 8,053,657 B2 * | 11/2011 | Sitrick et al. | 84/477 R |
| 8,158,870 B2 * | 4/2012 | Lyon et al. | 84/609 |
| 8,697,972 B2 * | 4/2014 | Dripps et al. | 84/470 R |
| 2003/0151628 A1 | 8/2003 | Salter | |
| 2005/0255914 A1 * | 11/2005 | McHale et al. | 463/31 |
| 2006/0009979 A1 * | 1/2006 | McHale et al. | 704/270 |
| 2007/0060351 A1 * | 3/2007 | Paratore et al. | 463/35 |
| 2011/0003638 A1 * | 1/2011 | Lee et al. | 463/35 |
| 2012/0090446 A1 * | 4/2012 | Moreno | 84/470 R |
| 2013/0167707 A1 * | 7/2013 | Shimizu et al. | 84/470 R |
| 2014/0033899 A1 * | 2/2014 | Dripps et al. | 84/483.1 |
| 2014/0053710 A1 * | 2/2014 | Serletic et al. | 84/609 |
| 2014/0100010 A1 * | 4/2014 | Lee et al. | 463/7 |

OTHER PUBLICATIONS

International Search Report and Written Opinion for PCT Application No. PCT/US2012/072196, dated Mar. 5, 2013, 13 pages.

* cited by examiner

*Primary Examiner* — Marlon Fletcher
(74) *Attorney, Agent, or Firm* — Patent Law Works LLP

(57) ABSTRACT

A system and method for teaching a user to discriminate and match musical pitch is disclosed. A pitch module generates a first melodic sequence for a user. The pitch module generates at least two symbolically depicted sequences including a first symbolic sequence that represents a pitch frequency that, when played, matches the first melodic sequence. A tracking module receives a selection of the first symbolic sequence and advances to a next level in response to receiving the selection of the first symbolic sequence.

20 Claims, 36 Drawing Sheets

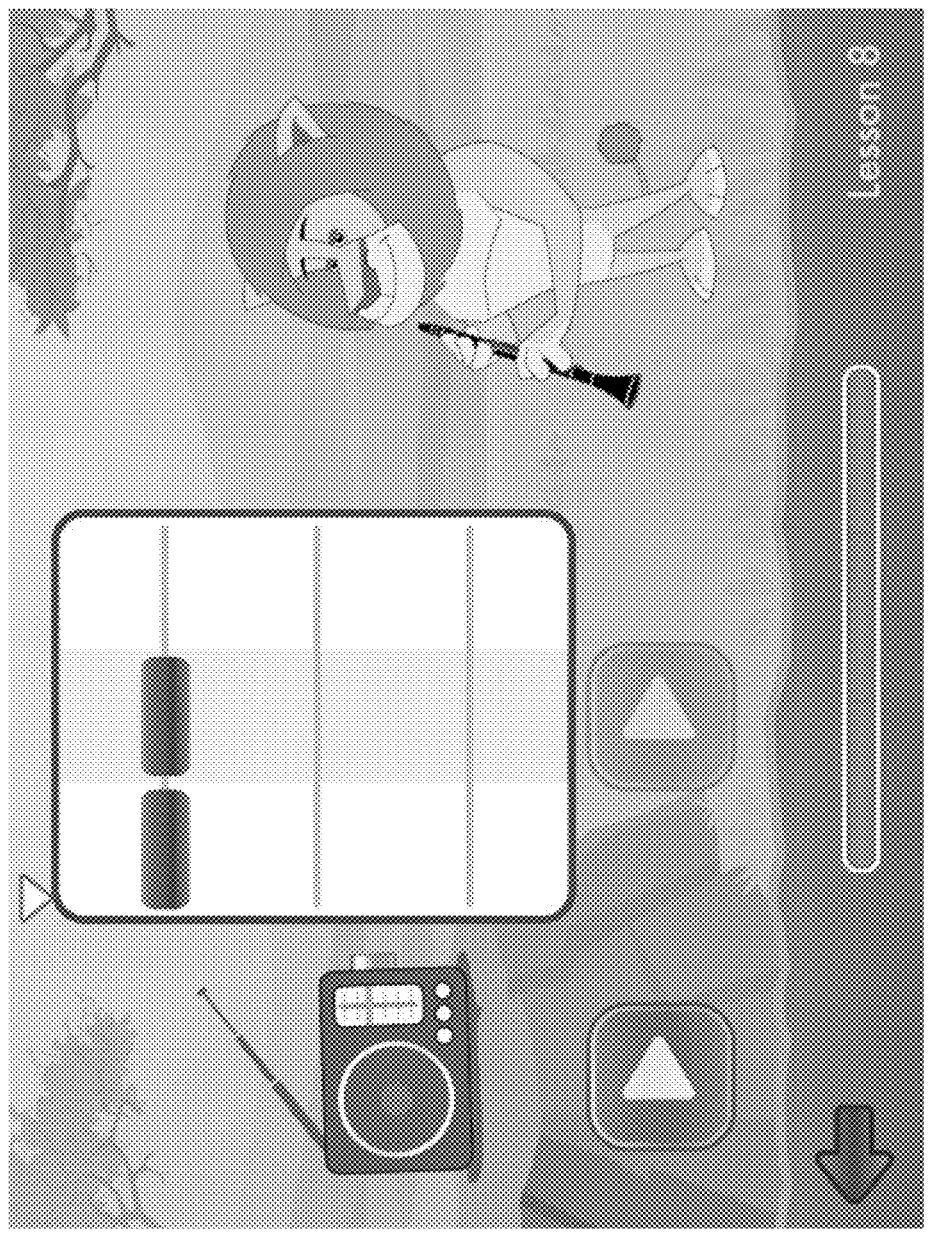

| Category | Main ID | Sub ID | Trophy | Where? | Segment |
|---|---|---|---|---|---|
| Game | 0 | 0 | 1st game unlocked | Lesson 7 | fm |
| | 1 | 1 | 2nd game unlocked | Lesson 10 | ta2 |
| | 2 | 2 | 3rd game unlocked | Lesson 12 | ta3 |
| Instrument | 3 | 0 | Piano | None | a4 |
| | 4 | 1 | Trumpet | Lesson 2 | ta2prep |
| | 5 | 2 | Marimba | Lesson 3 | ta2 |
| | 6 | 3 | Cello | Lesson 5 | fm |
| | 7 | 4 | Clarinet | Lesson 6 | fm |
| | 8 | 5 | Banjo | Lesson 7 | fm |
| | 9 | 6 | Accordian | Lesson 8 | ta2bp |
| | 10 | 7 | Sitar | Lesson 9 | ta2bp |
| | 11 | 8 | Pan Flute | Lesson 10 | ta2 |
| | 12 | 9 | Saxphone | Lesson 11 | ta3 |
| | 13 | 10 | Steel Drum | Lesson 12 | ta3 |
| | 14 | 11 | Organ | fmg level1 | fm |
| | 15 | 12 | Keyboard | ta2g level1 | ta2 |
| | 16 | 13 | Guitar | ta3g level1 | ta3 |
| | 17 | 14 | Bass | Lesson 14 | ct2 |
| Backing Band | 18 | 0 | Techno | fmg level 2 | fm |
| | 19 | 1 | Rock'n Roll | fmg level 3 | fm |
| | 20 | 2 | Country | fmg level 4 | fm |
| | 21 | 3 | Pop | ta2g level 2 | ta2 |
| | 22 | 4 | Funk | ta2g level 3 | ta2 |
| | 23 | 5 | Jazz | ta2g level 4 | ta2 |
| | 24 | 6 | Island | ta3g level 2 | ta3 |
| | 25 | 7 | Scottish | ta3g level 3 | ta3 |
| | 26 | 8 | Afrobet | ta3g level 4 | ta3 |
| Mastery | 27 | 0 | 1st game complete | fmg level 6 | fm |
| | 28 | 1 | 2nd game complete | ta2g level 6 | ta2 |
| | 29 | 2 | 3rd game complete | ta3g level 6 | ta3 |

SYSTEM AND METHOD FOR TEACHING AND TESTING MUSICAL PITCH

CROSS-REFERENCE TO RELATED APPLICATION

This application claims priority under 35 USC §119(e) to U.S. Application No. 61/581,561, entitled "System and Method for Teaching and Testing Musical Pitch" filed Dec. 29, 2011, the entirety of which is herein incorporated by reference.

BACKGROUND

The specification relates to educational techniques. In particular, the specification relates to a system for teaching a user to match and discriminate musical pitch.

The foundation for learning music lies in being able to discriminate and match one musical pitch from another. Once a user masters pitch, the user can learn to read musical notes, compose music and play the music. Though of considerable importance, past efforts at teaching these repertoires have not been approached systematically, particularly for the novice or young learner. For example, teaching instructions were often provided as trial and error exercises that are too complex for young learners to master.

SUMMARY

The specification advantageously describes a system and method for teaching a user to discriminate and match musical pitch. A pitch module generates a first melodic sequence for a user. The pitch module generates at least two symbolically depicted sequences including a first symbolic sequence that represents a pitch frequency that, when played, matches the first melodic sequence. A tracking module receives a selection of the first symbolic sequence and advances to a next level in response to receiving the selection of the first symbolic sequence.

BRIEF DESCRIPTION OF THE DRAWINGS

The specification is illustrated by way of example, and not by way of limitation in the figures of the accompanying drawings in which like reference numerals are used to refer to similar elements.

FIGS. 14A and 14B are graphic representation of a fourth example user interface for presenting a routine and corresponding lessons that teach a user to discriminate and match instances of musical pitch.

FIG. 22 is a graphic representation of a table of performance indicators earned in lessons and games in the application.

DETAILED DESCRIPTION

Example System

Figure 1:
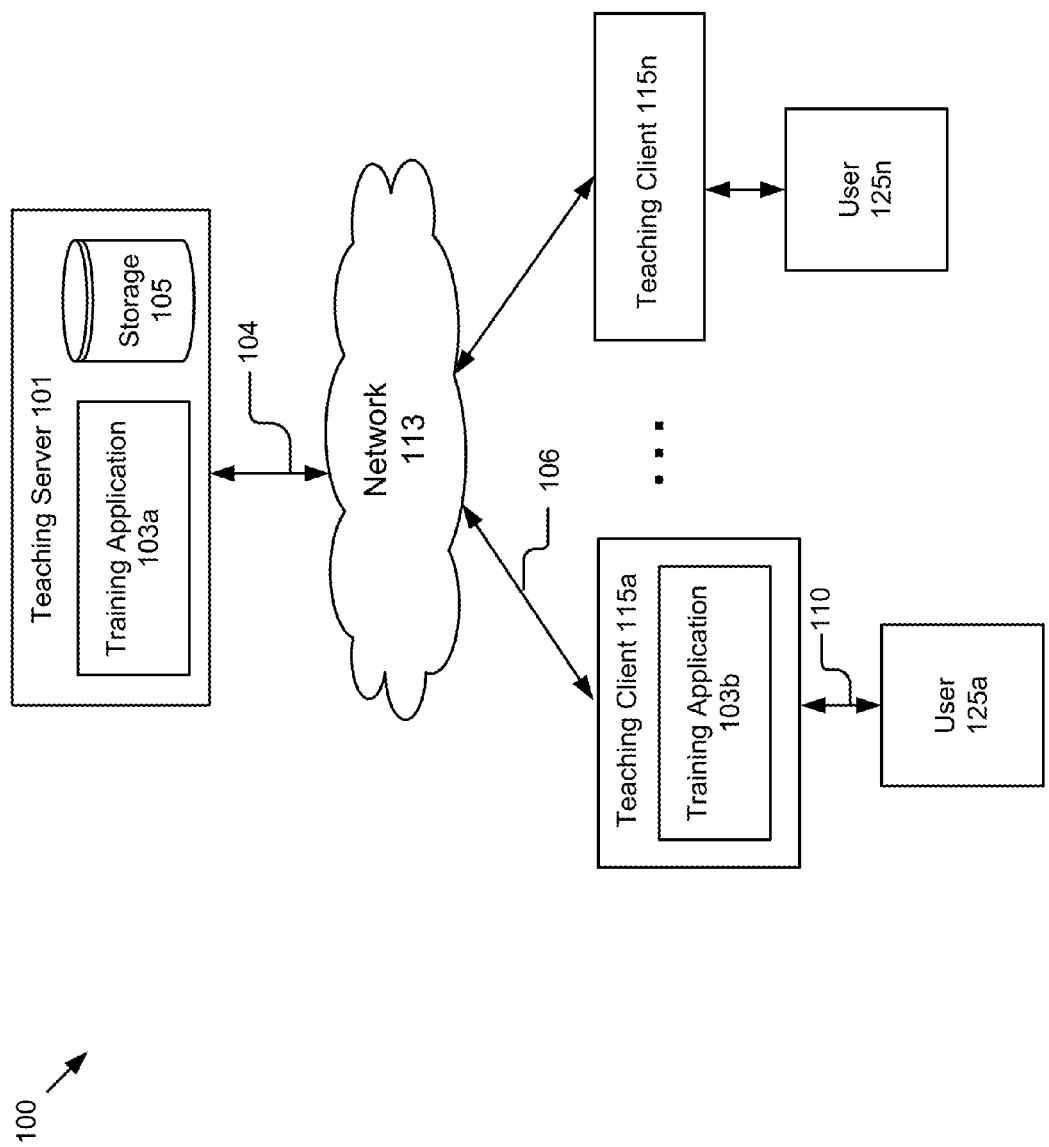
FIG. 1 is a block diagram illustrating an example system for teaching a user to match and discriminate musical pitch.

FIG. 1 illustrates a block diagram of a system 100 for teaching a user to match and discriminate musical pitch. The illustrated system 100 for teaching musical pitch includes teaching client 115a, 115n that are accessed by users 125a, 125n and a teaching server 101. In the illustrated example, these entities are communicatively coupled via a network 113. In FIG. 1 and the remaining figures, a letter after a reference number, for example, "115a" is a reference to the element having that particular reference number. A reference number in the text without a following letter, for example, "115" is a general reference to different instances of the element bearing that reference number. Although only two devices are illustrated, persons of ordinary skill in the art will recognize that an arbitrary number of teaching clients 115n are available to an arbitrary number of users 125n.

In one embodiment, the training application 103a is operable on the teaching server 101, which is coupled to the network 113 via signal line 104. Although only one teaching server 101 is shown, persons of ordinary skill in the art will recognize that multiple servers can be present. The teaching server 101 includes software (or hardware integrated as part of it) for creating teaching routines, executing created teaching routines, transmitting instructions to the teaching client 115 according to the executed teaching routines. The teaching server 101 is adapted for communication, interaction and cooperation with the teaching client 115.

In another embodiment, the training application 103b is stored on or accessed by a teaching client 115a, which is connected to the network 113 via signal line 106. For example, the training application 103b could be software that is downloaded and stored on the teaching client 115a or software that is stored on a disk and accessed by the teaching client 115a via a disk drive. In one embodiment, the training application 103b is a thin-client application that is stored in part on the teaching client 115a or in part on the teaching server 101. In other embodiments, the training application 103a is stored on the teaching server 101 and the teaching client 115a communicates with the teaching server 101 to receive graphical data from the training server 101 and render the graphical data as a user interface.

The teaching client 115a, 115n is a computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. The teaching client 115a communicates with the teaching server 101 to teach a user (e.g., a child) musical skills by generating and displaying various user interfaces in various routines. The user 125a interacts with the teaching client 115a via signal line 110.

The network 113 is a conventional type, wired or wireless, and has arbitrary number of configurations, for example, as a star configuration, token ring configuration or other configurations known to those skilled in the art. Furthermore, the network 113 includes a local area network (LAN), a wide area network (WAN) (e.g., the Internet), and/or other interconnected data paths across which multiple devices can communicate. In yet other instances, the network 113 is a peer-to-peer network. The network 113 is also coupled to or includes portions of a telecommunications network for sending data in a variety of different communication protocols. In one embodiment, the network 113 includes Bluetooth communication networks or a cellular communications network for sending and receiving data, for example, via short messaging service (SMS), multimedia messaging service (MMS), hypertext transfer protocol (HTTP), direct data connection, WAP, email, etc.

The training application 103 teaches a user musical skills related to the reading of musical notes, to composition and to playing of music. Specifically, the training application 103 provides routines that teach a user how to discriminate one pitch from another across different musical instruments; match one pitch to another across musical instruments; listen to a series of notes and indicate with symbols the pitch frequency heard such that when played they match what was heard; see symbols representing higher or lower pitch frequencies, listen to two series of pitch frequencies played, and choose which played series matches what was read; and create musical compositions from an array of instruments and pitch choices based upon arranging symbols associated with differing levels of pitch, ranging from low to high, for two instruments. In one embodiment, the training application 103 incorporates a motivational system that provides access to games based upon the routines that facilitate practice and extension of the skills learned. In another embodiment, the training application 103 also provides a unique composition studio for a user to play and compose.

Figure 8:
FIG. 8 is a graphic representation of an example user interface for displaying distinct areas of activity.

In one embodiment, the training application 103 presents the routines as lessons and games that present, evaluate, provide feedback and cumulatively sequence online instruction related to teaching musical pitch. In one embodiment, the training application 103 provides distinct routines and their corresponding lessons in distinct areas. For example, the training application 103 includes four areas in the graphic representation illustrated in FIG. 8. The training application 103 provides three distinct areas (e.g., learn, create and play) that are coordinated and work together to teach complex composite musical repertoires. A fourth area (e.g., trophies) is part of the integrated motivational system. In the learn area, the training application 103 generates the lessons that establish music repertoires. In the create area, the training application 103 generates a composition studio where a user can apply newly acquired musical skills. In the play area, the training application 103 generates games for the user to systematically practice and extend skills. The training application 103 tracks user's performance in the lessons and provides performance indicators (e.g. trophies) to the user based on the user's performance. The training application 103 plays cartoon videos of instruments that the user earns during the lessons for the user in the trophies area. After a user completes selected lessons, the training application 103 can unlock an instrument as a trophy for a user to use in the create area, provide a user with access to one of the games in the play area or add background musical tracks to compositions for the user. The training application 103 provides other trophies to a user when the user completes all levels in the games.

Figure 9:
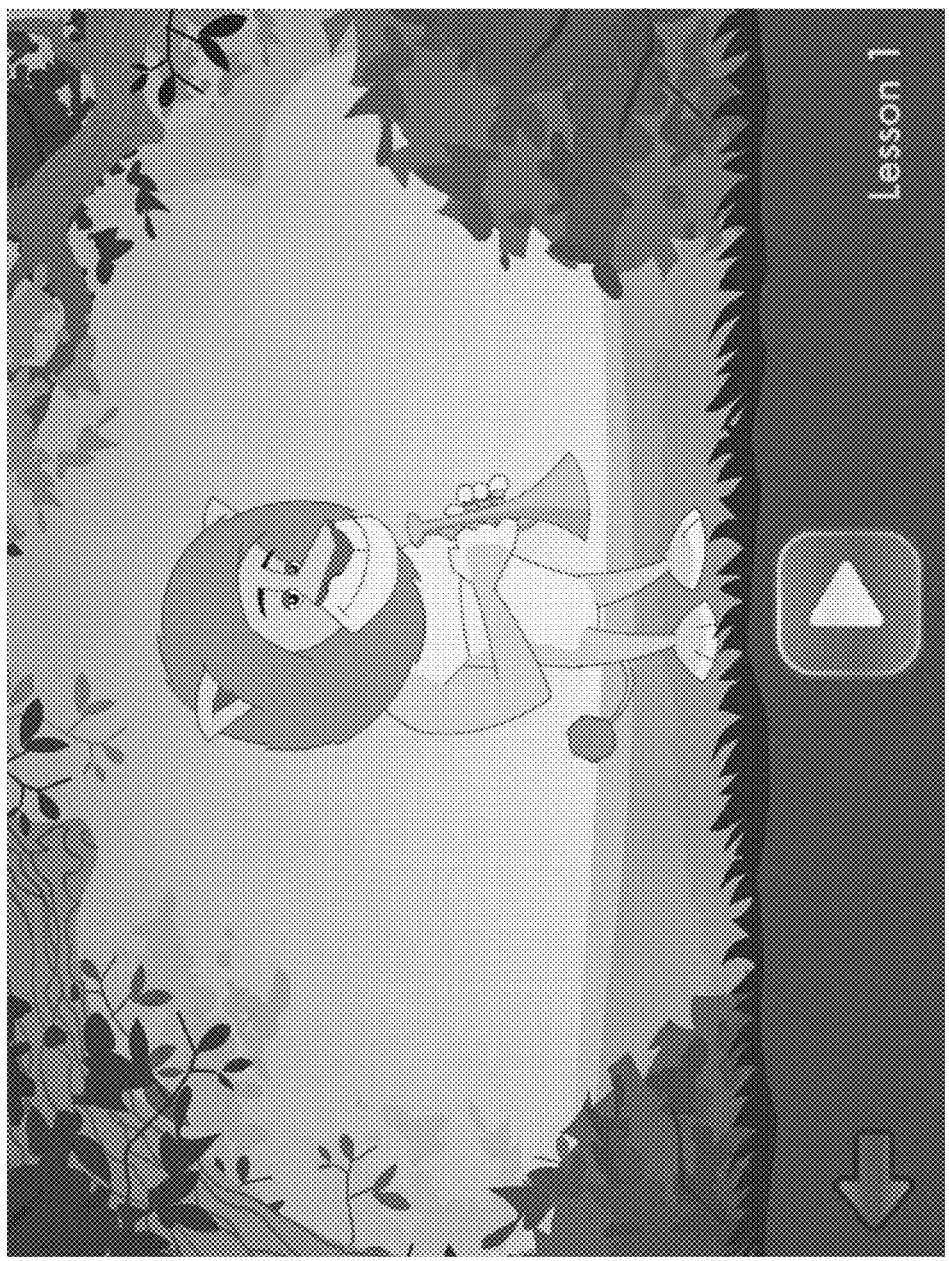
FIG. 9 is a graphic representation of a first example user interface for presenting a routine and corresponding lessons that teach a user to listen and learn musical pitch.
Figure 10:
FIG. 10 is a graphic representation of a first example user interface for presenting a routine and corresponding lessons that teach a user to discriminate and match instances of musical pitch.

In one embodiment, the training application 103 presents routines and the corresponding lessons sequentially. For example, the training application 103 first presents lesson one (e.g., as depicted in FIG. 9) to a user, which teaches the user pitch basics by playing a pitch for the user to listen, then advances the user to lesson two (e.g., as depicted in FIG. 10), which teaches the user to discriminate pitches using the pitch basics learned from lesson one, and then proceeds to lesson three, lesson four, etc. In another embodiment, the training application 103 generates a next routine and corresponding lesson based on the user's learning performance on one or more previous routines and corresponding lessons. For example, if the training application 103 tracks and determines that a user received three consecutive correct answers on first attempts in both lesson two and lesson three, the training application 103 determines that the user is more advanced and generates lesson five instead of lesson four because of the user's extraordinary performance on the previous two lessons. In yet another embodiment, the training application 103 presents a specific routine and corresponding lesson responsive to receiving a request from a user. For example, the training application 103 provides a routine and corresponding lessons (e.g., as depicted in FIGS. 17A-E) that teach a user to compose in a composition studio responsive to the user clicking on the "create" button in FIG. 8.

The storage device 105 is a non-volatile memory device or similar persistent storage media for storing instructions and/or data used for teaching musical pitch. For example, the storage device 105 includes a user database (not shown) to store a user's responses, compositions and other data used in learning musical pitch. The storage device 105 is communicatively coupled to the training application 103a.

Figure 2A:
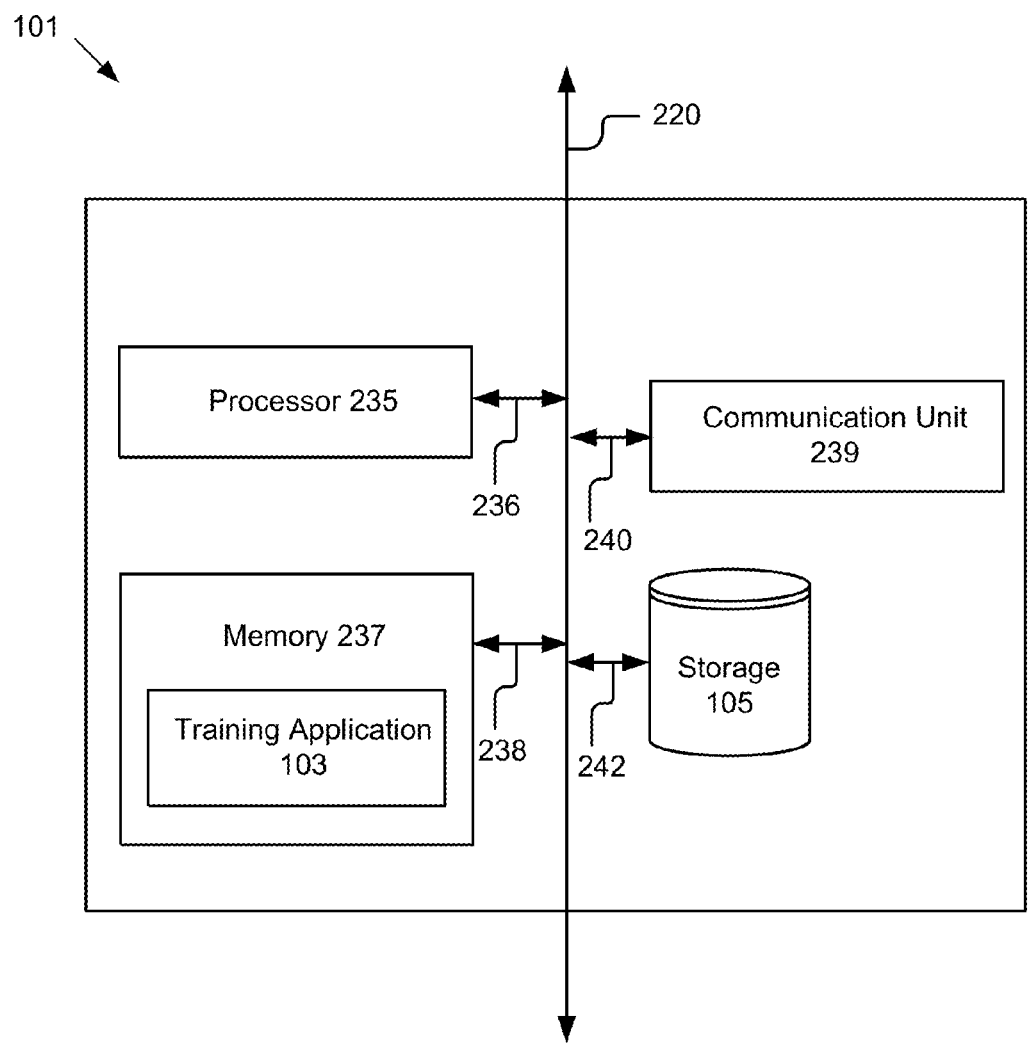
FIG. 2A is a block diagram illustrating one instance of hardware implementing the functionality of teaching a user to match and discriminate musical pitch.

Referring now to FIG. 2A, example hardware implementing the functionality of teaching a user to match and discriminate musical pitch. FIG. 2A is a block diagram of the teaching server 101 that includes a processor 235, memory 237, storage 105 and a communication unit 239.

The processor 235 includes some or all of an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may include various computing architectures including a complex instruction set computer (CISC) architecture, a reduced instruction set computer (RISC) architecture, or an architecture implementing a combination of instruction sets. Although only a single processor is shown in FIG. 2A, multiple processors are included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by the processor 235. The memory 237 is coupled to the bus 220 for communication with the other components via signal line 238. The instructions and/or data may include code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 239 transmits and receives data to and from the teaching server 101. The communication unit 239 is coupled to the bus 220 via signal line 240. In one embodiment, the communication unit 239 includes a port for direct physical connection to the network 113 or to another communication channel. For example, the communication unit 239 includes a USB, SD, CAT-5 or similar port for wired communication with the teaching client 115. In another embodiment, the communication unit 239 includes a wireless transceiver for exchanging data with the teaching client 115 or any other communication channel using one or more wireless communication methods, such as IEEE 802.11, IEEE 802.16, BLUETOOTH® or another suitable wireless communication method.

In another embodiment, the communication unit 239 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In another embodiment, the communication unit 239 includes a wired port and a wireless transceiver. The communication unit 239 also provides other conventional connections to the network for distribution of files and/or media objects using standard network protocols such as TCP/IP, HTTP, HTTPS and SMTP as will be understood to those skilled in the art.

Example Training Application

Figure 2B:
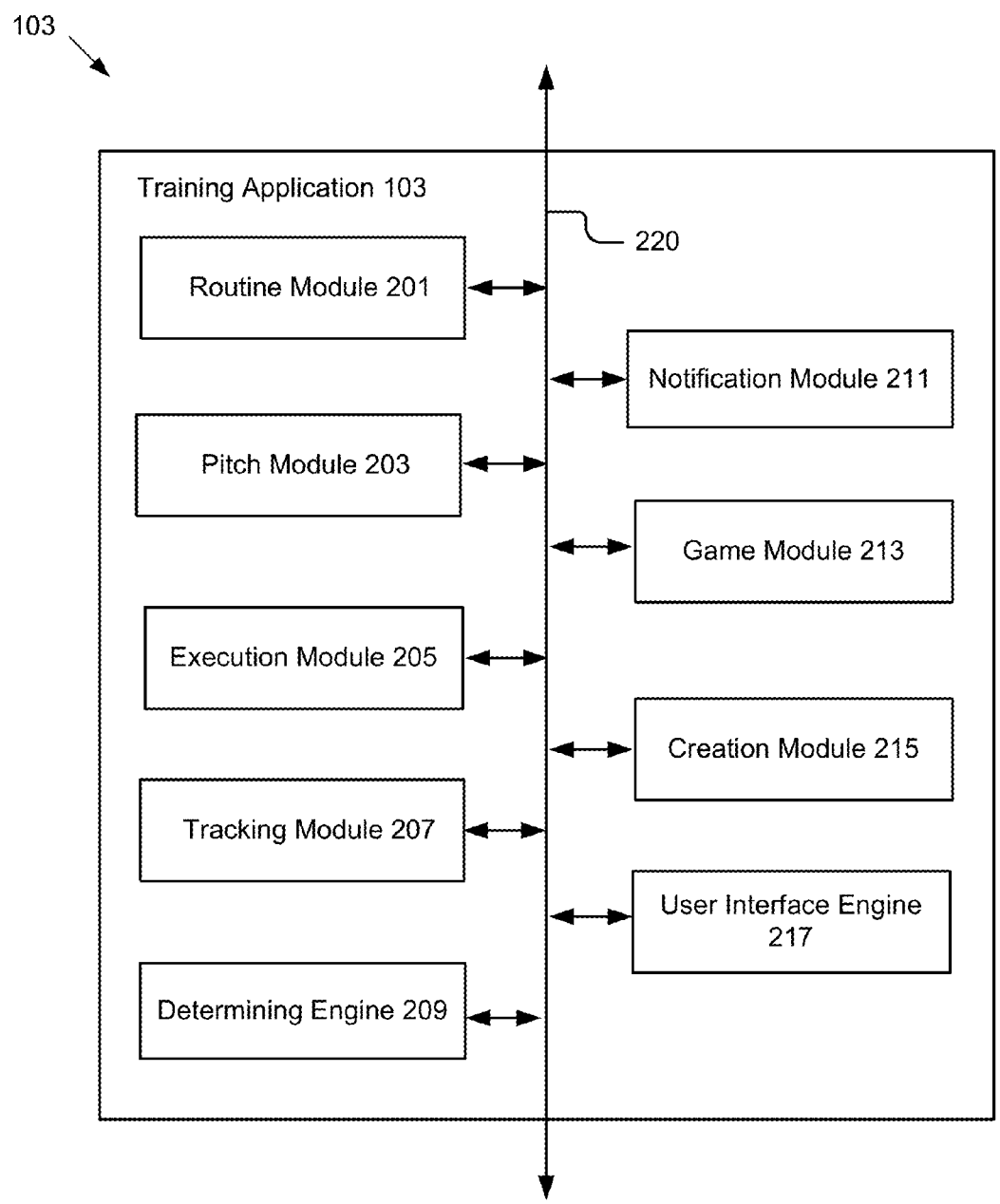
FIG. 2B is a block diagram illustrating an example training application.

Referring now to FIG. 2B, an example training application 103 is shown in more detail. In one embodiment, the training application 103 includes a routine module 201, a pitch module 203, an execution module 205, a tracking module 207, a determining engine 209, a notification module 211, a game module 213, a creation module 215 and a user interface engine 217 that communicate over the bus 220.

The routine module 201 is software including routines for generating one or more teaching routines that teach musical skills to a user. In one embodiment, the routine module 201 is a set of instructions executable by the processor 235 to provide the functionality described below for generating the one or more teaching routines. In another embodiment, the routine module 201 is stored in the memory 237 of the teaching server 101 and is accessible and executable by the processor 235. The routine module 201 is adapted for cooperation and communication with the processor 235 and other components of the teaching server 101 via the bus 220.

In one embodiment, the routine module 210 generates the routines as lessons and games that present, evaluate, provide feedback and cumulatively sequence online instruction related to teaching musical pitch. For example, the diagram below illustrates different routines that appear in a level:

| Lesson | Routine |
| --- | --- |
| 1 | a5 |
| 2 | ta2p |
| 3 | ta2 |
| 4 | a4 |
| 5 | fm |
| 6 | fm |
| 7 | fm |
| 8 | ta2bp |
| 9 | ta2bp |
| 10 | ta2 |
| 11 | ta3 |
| 12 | ta3 |
| 13 | ct1 |
| 14 | ct2 |

Figure 11:
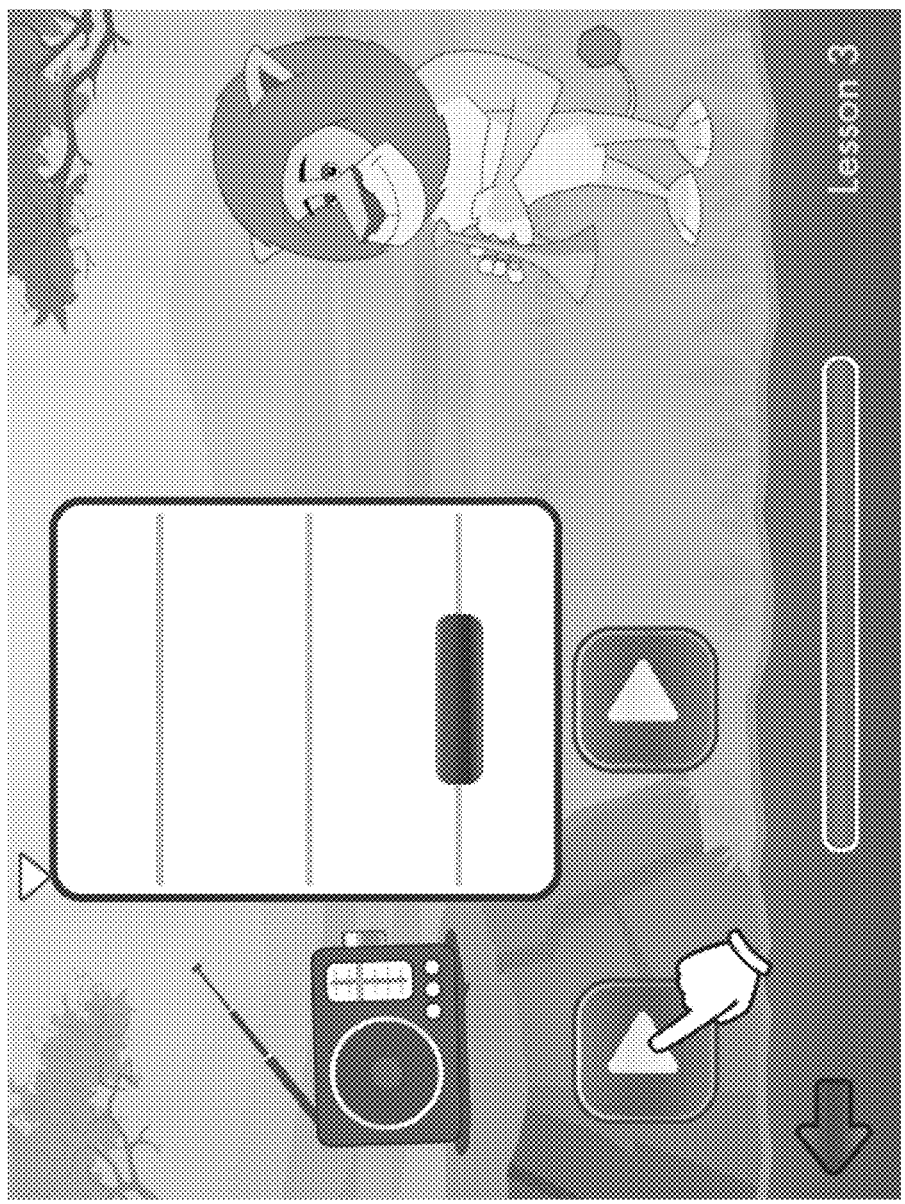
FIG. 11 is a graphic representation of a second example user interface for presenting a routine and corresponding lessons that teach a user to discriminate and match instances of musical pitch.
Figure 12:
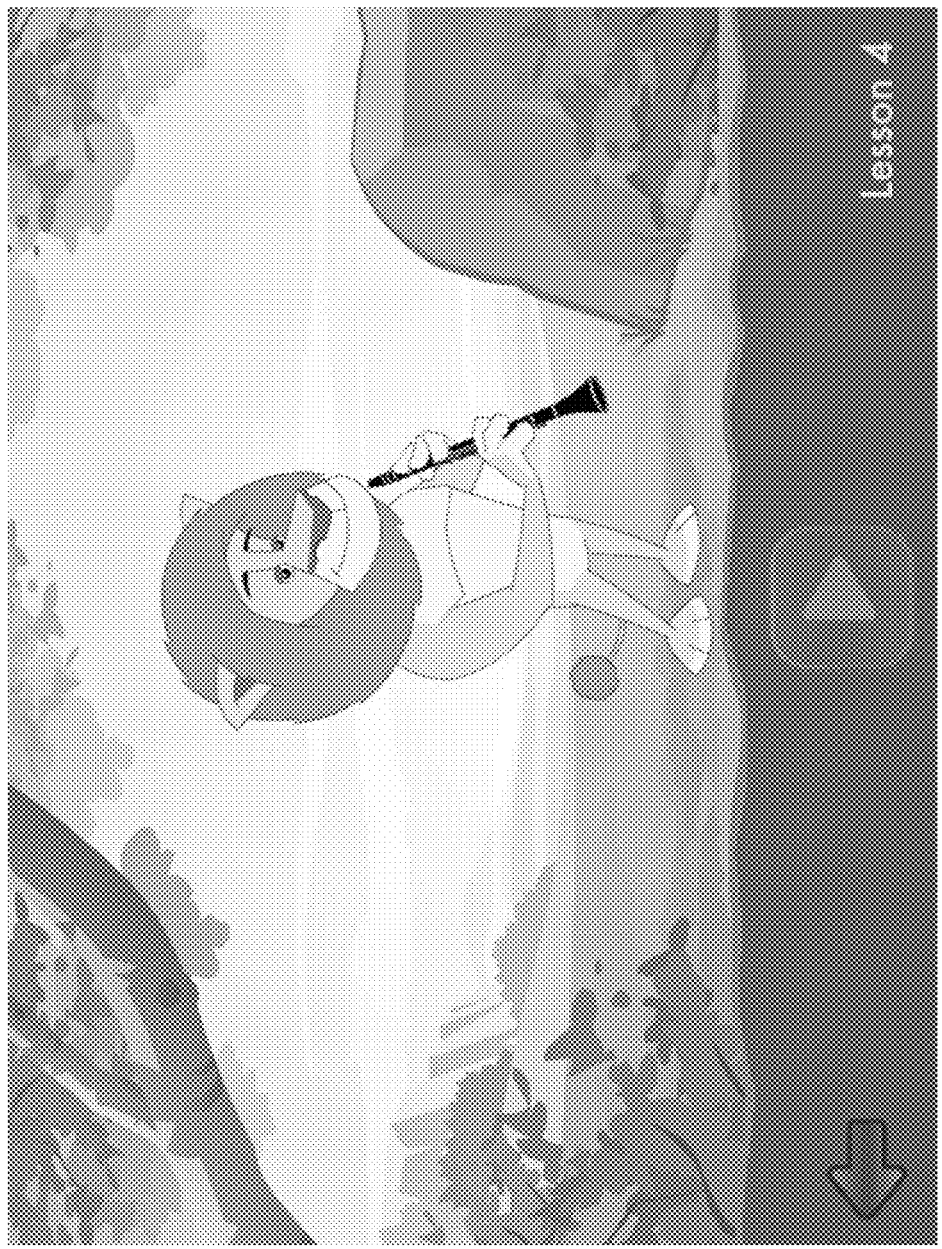
FIG. 12 is a graphic representation of a second example user interface for presenting a routine and corresponding lessons that teach a user to listen and learn musical pitch.

In one embodiment, the routine module 201 generates a routine for a user to listen and learn a pitch. Examples of the routine and corresponding lessons are depicted in FIGS. 9 and 12. FIG. 9 illustrates lesson 1, which employs routine a5. In another embodiment, the routine module 201 generates a routine for a user to discriminate and match instances of musical pitch. For example, the routine module 201 generates a routine for a user to listen to a pitch from a radio and two pitches played from two cartoon characters (e.g., a lion and a squirrel) and to select which character played the same pitch from the radio. Examples of the routine and corresponding lessons are depicted in FIGS. 10, 11, 13A, 13B, 14A, 14B, 15, 16A and 16B. In yet another embodiment, the routine module 201 generates a routine that helps a user to create compositions in a composition studio. For example, the routine module 201 generates a routine (lessons 13 and 14) for a user to add notes, to start playing notes, to stop playing notes, to erase a note, to erase all notes and to change musical instruments. Examples of the routine and corresponding lessons are depicted in FIGS. 17A-E, 18A-E and 19A-B. Persons of ordinary skill in the art will recognize that other routines can be generated to teach musical skills to a user.

In one embodiment, the routine module 201 transmits the one or more routines to other modules in the training application 103 to instruct the other modules to function correspondingly. In one example, the routine module 201 sends a routine to the pitch module 203 to generate at least one sequence of pitches that is used in the routine. In another example, the routine module 201 transmits routine information to the execution module 205 to cause the execution module 205 to execute an action. In yet another example, the routine module 201 transmits routine information to the user interface engine 217 to generate a user interface corresponding to the routine and to present graphical data for displaying the user interface to a user. In yet another example, the routine module 201 instructs the execution module 205 or the game module 213 to provide a trophy to a user based on user's learning performance. In another embodiment, the routine module 201 also stores the one or more routines in the storage 105.

The pitch module 203 is software including routines for generating a training sequence. In one embodiment, the pitch module 203 is a set of instructions executable by the processor 235 to provide the functionality described below for generating the training sequence. In another embodiment, the pitch module 203 is stored in the memory 237 of the teaching server 101 and is accessible and executable by the processor 235. The pitch module 203 is adapted for cooperation and communication with the processor 235 and other components of the teaching server 101 via the bus 220.

In one embodiment, the pitch module 203 receives a routine from the routine module 201 and generates at least one training sequence included in the routine. For example, the pitch module 203 receives a routine from the routine module 201 that teaches a user to learn a pitch and generates a training sequence including the pitch.

In one embodiment, the pitch module 203 generates a training sequence that includes a melodic sequence. The melodic sequence includes at least one pitch from a musical instrument. Each pitch is associated with a pitch frequency. For example, the melodic sequence is a passage of pitches from a horn that include low pitches having low frequencies and high pitches having high frequencies. A pitch associated with a specific pitch frequency, when played on different musical instruments, can sound different to a user. A pitch associated with a specific pitch frequency, when played on a same musical instrument by different players, can also sound different to a user. The training application 103 allows a user to perceive and discriminate differences of pitches caused by different pitch frequencies, different musical instruments and different players who play the pitches.

In another embodiment, the pitch module 203 generates a training sequence that includes a symbolically depicted sequence. The symbolically depicted sequence includes at least one pitch with a symbol indicating the pitch frequency. In one embodiment, the pitch module 203 generates a symbolically depicted sequence by placing a graphic of a button on a melody map on which there are one or more pitch frequency lines ranging from a lower to a higher pitch. An example of a symbolically depicted sequence is depicted in FIG. 11. Persons of ordinary skill in the art will recognize that other symbols can be used to generate a symbolically depicted sequence.

In one embodiment, the pitch module 203 communicates with the tracking module 207 and the user interface engine 217 to generate at least one training sequence in response to receiving a selection from a user. For example, when a user selects a button showing that a player is playing a violin on a user interface generated by the user interface engine 217, the pitch module 203 generates a melodic sequence including different pitches from the violin based on the user's selection provided by the tracking module 207.

In another embodiment, the pitch module 203 also communicates with the determining engine 209 to modify parameters of the at least one training sequence and generate the at least one training sequence using the modified parameters. For example, the pitch module 203 generates a first training sequence including a first pitch having a first pitch frequency and a second training sequence including a second pitch having a second pitch frequency. The first pitch frequency is higher than the second pitch frequency at a first interval. A user is asked to distinguish the pitch frequency difference between the first and second training sequences. The determining engine 209 determines to increase or decrease the first interval to a second interval based on the user's learning performance. The pitch module 203 modifies the first interval to the second interval and iterates the generation of a first training sequence and a second training sequence using the second interval for the user to learn.

The execution module 205 is software including routines for executing an action. In one embodiment, the execution module 205 is a set of instructions executable by the processor 235 to provide the functionality described below for executing the action. In another embodiment, the execution module 205 is stored in the memory 237 of the teaching server 101 and is accessible and executable by the processor 235. The execution module 205 is adapted for cooperation and communication with the processor 235 and other components of the teaching server 101 via the bus 220.

In one embodiment, the execution module 205 receives routine information from the routine module 201 and executes one or more actions (e.g., playing a training sequence, unlocking a musical instrument) based on the routine information. In one embodiment, the routine module 201 generates a routine, instructs the pitch module 203 to generate at least one training sequence included in the routine and instructs the execution module 205 to play the at least one training sequence. For example, the execution module 205 repeatedly plays a melodic sequence and a symbolically depicted sequence for a user based on a routine that teaches the user to distinguish the pitch frequency difference between the two sequences.

In another embodiment, the execution module 205 generates a trophy for a user when the user's learning performance on routines and corresponding lessons satisfies a predetermined requirement. In one embodiment, the execution module 205 unlocks the musical instrument that is used in a routine as a trophy for the user. The user uses the unlocked instrument for playing and creating a composition. For example, the routine module 201 generates a routine that teaches a user to select, from at least two symbolically depicted sequences, a symbolically depicted sequence that matches a melodic sequence in pitch frequency. The pitch module 203 generates the at least two symbolically depicted sequences and the melodic sequence and the execution module 205 plays the sequences for the user as many times as the user desires. The user tries one or more times to select the correct symbolically depicted sequence that matches the melodic sequence. In one embodiment, if the user gets a number of first selections correct (e.g. three) for selecting the correct symbolically depicted sequence, the execution module 205 unlocks an instrument (e.g. a violin) that was used in the melodic sequence for the user. Other variations are possible, for example, the execution module can unlock an instruct in response to a number of consecutive correct selections. The user can then play the instrument and compose using the instrument. In another embodiment, the execution module 205 also retrieves a music cartoon featuring the unlocked musical instrument from the storage 105 and plays the music cartoon for the user. In yet another embodiment, responsive to a user completing a lesson, the execution module 205 expands the size of a "backing band" pool (e.g., background musical tracks) so that the user can add more musical tracks when composing.

The tracking module 207 is software including routines for receiving user inputs (e.g., a selection, a stimulus) and managing a learning progress for a user based on the user inputs. In one embodiment, the tracking module 207 is a set of instructions executable by the processor 235 to provide the functionality described below for receiving the user inputs and managing the learning progress for the user based on the user inputs. In another embodiment, the tracking module 207 is stored in the memory 237 of the teaching server 101 and is accessible and executable by the processor 235. The tracking module 207 is adapted for cooperation and communication with the processor 235 and other components of the teaching server 101 via the bus 220.

In one embodiment, the tracking module 207 receives a selection of at least one pitch from a user based on a routine generated by the routine module 201. In one embodiment, responsive to receiving the user's selection, the pitch module 203 generates a training sequence including the at least one pitch and the execution module 205 plays the sequence for the user to listen to and learn music pitch. FIGS. 9 and 12 are examples of routines and lessons that teach a user to listen and learn a pitch. In FIG. 9, each time a user selects a play button positioned under a cartoon character (e.g., the lion), the pitch module 203 generates a melodic sequence including a single pitch and the execution module 205 plays the melodic sequence for the user as if the lion played the pitch. The pitches that the user selects are varied across different instruments and pitch frequencies, ranging from low to high.

In FIG. 12 (lesson 4), when a user touches or clicks on the play button under the cartoon lion, the pitch module 203 generates a melodic sequence including a high pitch and a low pitch on the same instrument and the execution module 205 plays the melodic sequence to simulate the lion's play. The user listens to the two different pitches on the same instrument and distinguishes the pitch differences. When the routine repeats, the user listens to higher versus lower pitches across a range of instruments where a same pitch may be lower in one instrument and higher in another instrument and learns pitch differences on different instruments.

In another embodiment, the tracking module 207 communicates with the user interface engine 217 to receive from a user a selection of a training sequence that matches another training sequence. In one embodiment, the tracking module 207 sends the selection to the determining engine 209 to determine if the user's selection is correct and manages a learning progress of the user based on the determination. In one embodiment, the tracking module 207 manages the learning progress by maintaining a counter and a progress indicator (e.g., a progress bar). For example, the tracking module 207 sets a zero value for a counter that counts a number of consecutive correct selections. When the tracking module 207 receives from the determining engine 209 a determination indicating that a user's selection is correct and the selection is made on the user's first matching attempt, the tracking module 207 increments the counter by one and updates the progress indicator to show that the user is progressing. In some cases, the tracking module 207 updates the progress indicator after incrementing the counter value to N. In another embodiment, the tracking module 207 manages the learning progress by communicating with other modules in the training application 103 to advance a user to a next level. Advancing to a next level includes, but is not limited to, starting a new routine and corresponding lessons, unlocking a musical instrument, generating a game and generating a graphical representation of a trophy. The management of the learning progress for a user is described in more detail below with reference to the determining engine 209.

The determining engine 209 is software including routines for determining whether a user's selection is correct and whether to advance to a next level. In one embodiment, the determining engine 209 is a set of instructions executable by the processor 235 to provide the functionality described below for determining whether the user's selection is correct and whether to advance to the next level. In another embodiment, the determining engine 209 is stored in the memory 237 of the teaching server 101 and is accessible and executable by the processor 235. The determining engine 209 is adapted for cooperation and communication with the processor 235 and other components of the teaching server 101 via the bus 220.

In one embodiment, the tracking module 207 receives a selection of a first training sequence that matches a second training sequence from a user and transmits the selection to the determining engine 209. The determining engine 209 compares the first training sequence to the second training sequence and determines whether the user's selection is correct. If it is a match, the determining engine 209 determines whether to advance to a next level (e.g., unlocking a musical instrument, generating a game and providing access to the game, etc.). In one embodiment, the determining engine 209 also transmits the determination to the notification module 211 to notify the user whether the user's selection is correct. FIGS. 10, 11, 13A, 13B, 14A, 14B, 15, 16A and 16B are examples of routines and corresponding lessons that teach a user to discriminate and match musical pitch. These figures illustrate how the determining engine 209 makes a determination and how the tracking module 207 manages a learning progress for a user based on the determination.

In FIG. 10 (lesson 2), a user taps a button to trigger the pitch module 203 to generate a melodic sequence including a pitch. The execution module 205 plays the melodic sequence for the user. The user listens to the pitch played as though it was coming from a depicted radio (herein referred to as "radio pitch."). The user also taps play buttons positioned under two cartoon characters to trigger the pitch module 203 to generate two melodic sequences. Each of the two melodic sequences includes a pitch associated with a pitch frequency. The execution module 205 plays the two pitches as if the two characters are playing the pitches (herein referred to as "character pitches"). One of the two different pitch frequencies of the character pitches matches the pitch frequency of the radio pitch. The user hears each character pitch and taps on the character that played the same pitch as the radio pitch. The user can repeatedly select the play buttons to cause the execution module 205 to repeatedly play the radio pitch and the character pitches for the user to compare. The tracking module 207 receives the user's selection of one of the character pitches and sends the selection to the determining engine 209. The determining engine 209 compares the selected character pitch to the radio pitch and determines whether the selection is correct. If the determining engine 209 determines that the user chose incorrectly, the execution module 205 plays the radio pitch and the character pitches sequentially for the user. The user listens to the same pitches again and the routine repeats. If the determining engine 209 determines that the user chose correctly, the tracking module 207 advances the user to a different pitch combination. If the determining engine 209 determines that the user chose correctly at the first attempt, the tracking module 207 advances a progress indicator, for example, updates a three step progress indicator from a first step to a second step. If the determining engine 209 determines that the user got three correct selections on the first matching attempts on different pitch combinations, the tracking module 207 advances the user to a next routine or communicates with the execution module 205 to unlock a musical instrument and present a short music cartoon featuring the instrument to the user. The determining engine 209 also communicates with the notification module 211 to transmit a notification to the user to inform the user of an incorrect or correct selection.

FIGS. 11, 14A, 14B, 15, 16A and 16B illustrate routines and lessons that teach a user to discriminate and match pitches using a melody map. The melody map is a music notational system where a pitch is represented by a pitch frequency line and a symbolically depicted sequence including the pitch is generated. FIG. 11 (lesson 3) is an example of a routine that teaches a user to produce a matching pitch sound by placing a graphic of a button on a melody map on which there are of three pitch frequency lines ranging from a lower to a higher pitch. The routine first provides a demonstration to a user. The pitch module 203 generates a demonstration sequence including a pitch and the execution module 205 plays the demonstration sequence as if the radio is playing the sequence. When the execution module 205 is playing the pitch of the demonstration sequence, the user interface engine 217 generates graphical data for displaying a user interface that includes a correct response sequence on the melody map with the pitch being prompted by a finger on the corresponding frequency line. The response sequence is then faded out and the demonstration ends. The user learns how to match pitches from the demonstration.

After the demonstration, the pitch module 203 generates a melodic sequence including a pitch (herein referred to as "radio pitch") and the execution module 205 plays the melodic sequence for the user. The user then places a button by tapping or clicking on the location (e.g., one of the three pitch frequency lines) that indicates a matching pitch (herein referred to as "button pitch"). The pitch module 203 generates a symbolically depicted sequence including the button pitch based on the user's selection and the execution module 205 plays the button pitch. The execution module 205 also replays the radio pitch and the button pitch if the user wants to hear and compare the pitches again. Once the user determines that the button pitch matches the radio pitch, the user taps a character. The tracking module 207 receives the selection of the character from the user and sends the selection to the determining engine 209 to determine if the selection is correct. If the selection is not correct, the execution module 205 plays the radio pitch as the character plays. In some embodiments, in response to an incorrect select, the user interface engine 217 highlights the correct pitch on the melody map as the character plays. The routine repeats until the user is correct. If the selection is correct, the execution module 205 plays the radio pitch and the user interface engine 217 highlights the pitch indicated by the button placement on the melody map as the character plays. If correct on the first attempt, the tracking module 207 advances the progress bar by one space. If the selection is correct on a number of first correct selections (e.g. three times), the tracking module 207 advances to a next level (e.g., a next routine and lesson). In one embodiment, the determining engine 209 also communicates with the notification module 211 to notify the user about the incorrect or correct selection.

Figure 14B:
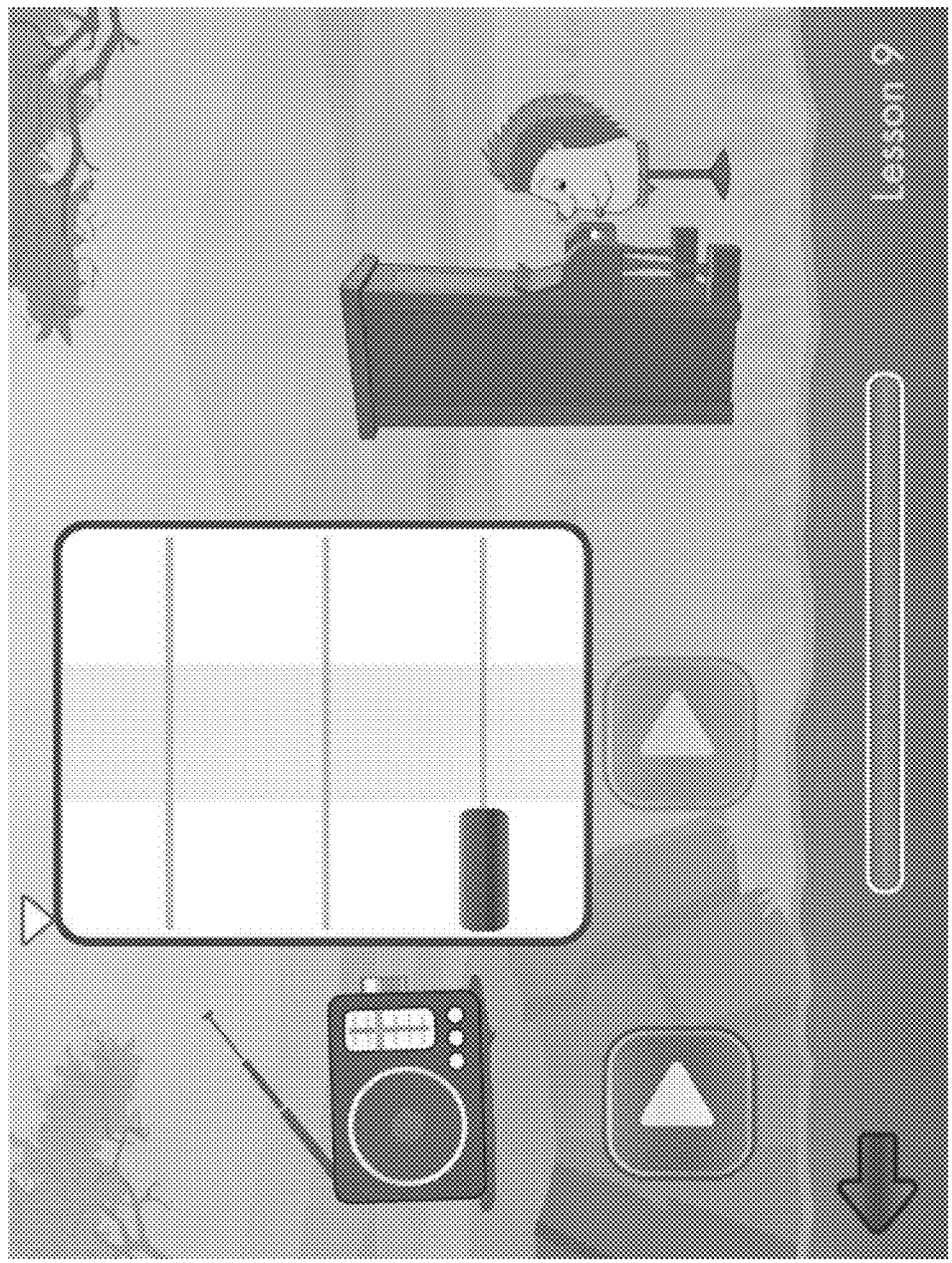
Figure 15:
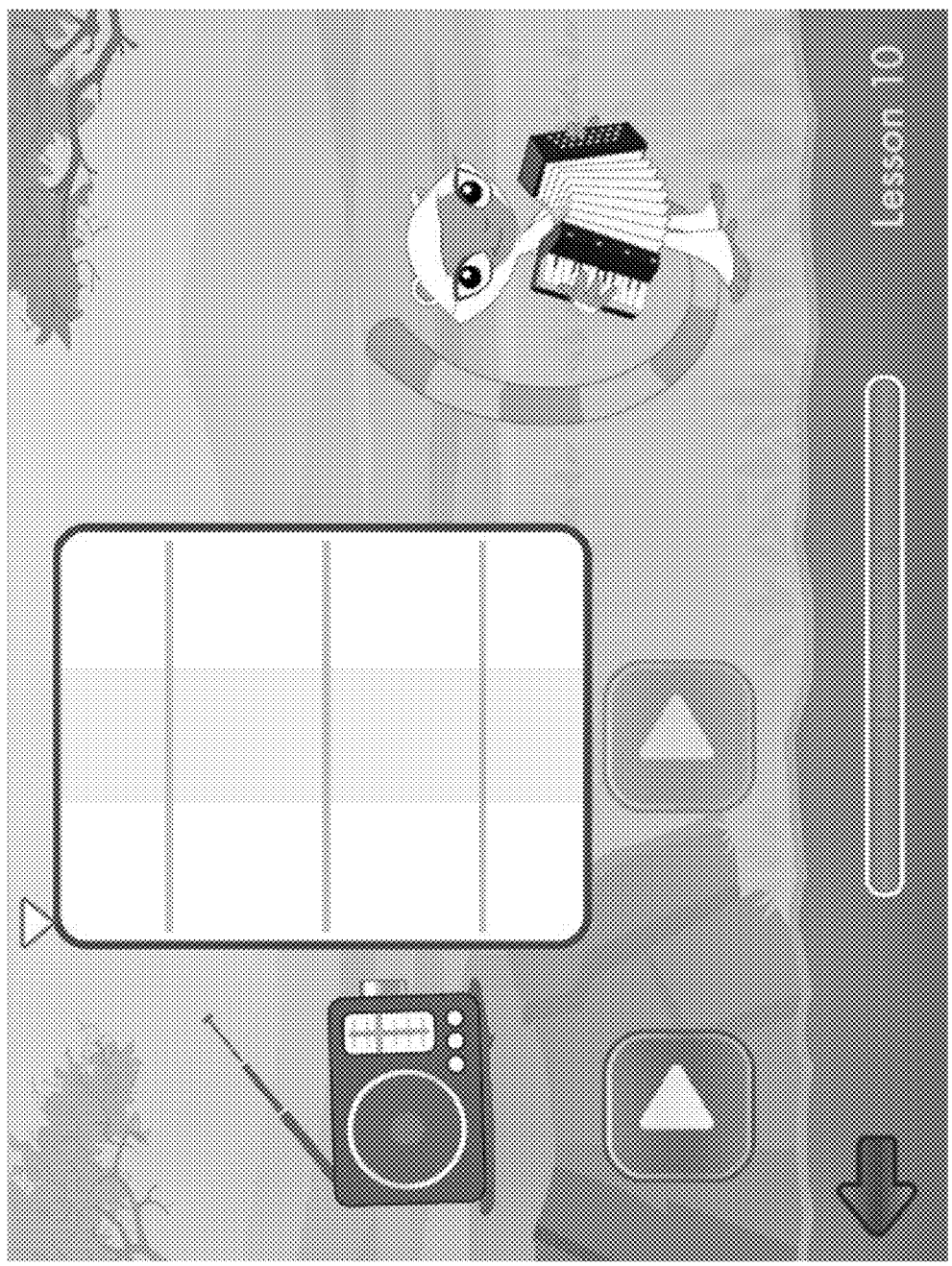
FIG. 15 is a graphic representation of a fifth example user interface for presenting a routine and corresponding lessons that teach a user to discriminate and match instances of musical pitch.

FIG. 14A (lesson 8) illustrates a routine that is similar to the routine in FIG. 11. FIG. 14A includes the placement of three pitch indicators on an expanded melody map, where two of the three pitch indicators are in place. According to this routine, a user is asked to indicate the third matching pitch using the procedure described in FIG. 11. Once the determining engine 209 determines that the user gets three correct selections on first attempts, the tracking module 207 advances the user to a next level. In one example, the tracking module 207 advances the user to the routine shown in FIG. 14B (lesson 9), where the routine indicates a first correct pitch placement and asks the user to match the remaining two pitches on the melody map. In another example, the tracking module 207 advances the user to the routine shown in FIG. 15 (lesson 10), where the routine asks a user to listen to a sequence of pitches (e.g. three pitches), and with no priming, to indicate where on the melody map each pitch should be placed. The training application 103 uses these routines to teach a user to transcribe music that the user hears into a notational system, which is an important skill for musical composition.

Figure 16A:
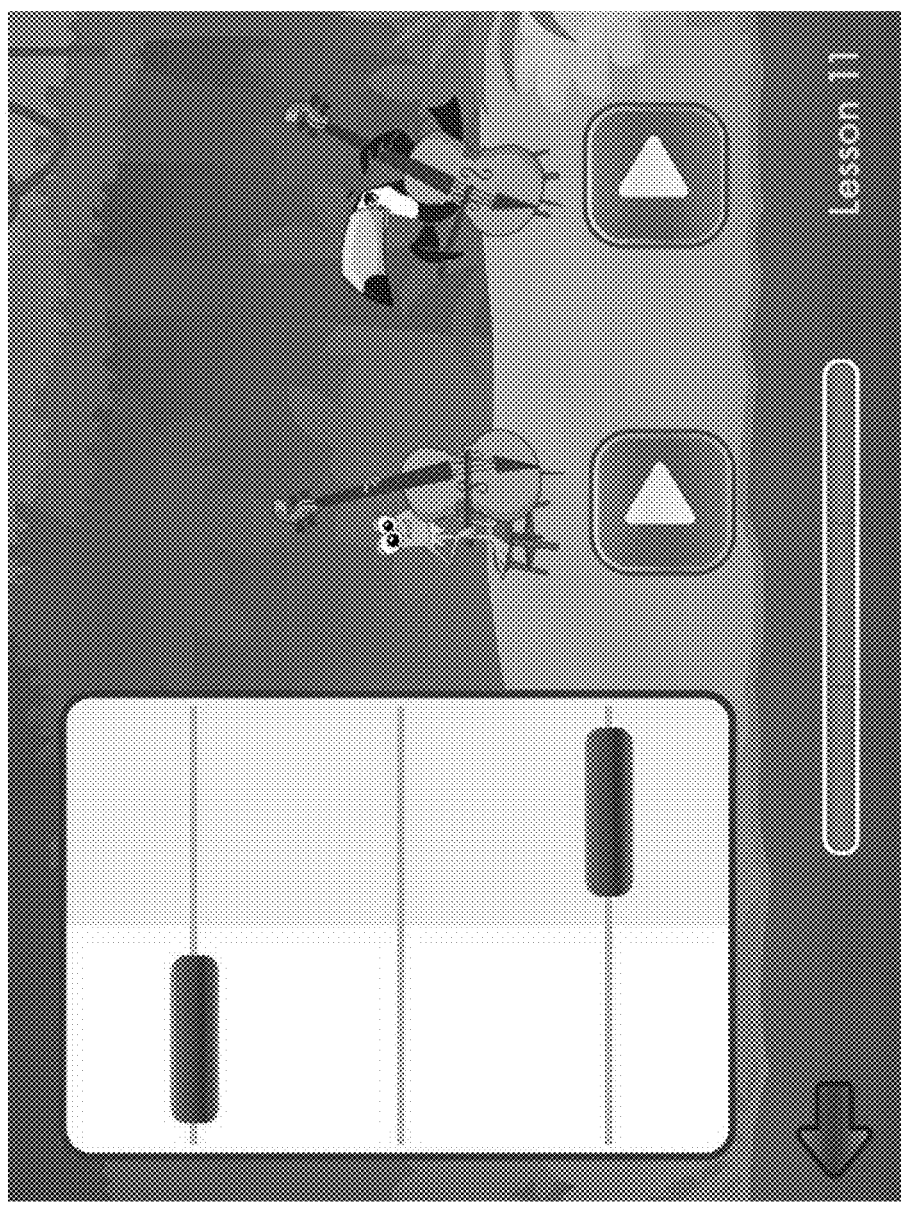
FIGS. 16A and 16B are graphic representation of a sixth example user interface for presenting a routine and corresponding lessons that teach a user to discriminate and match instances of musical pitch.

FIG. 16A (lesson 11) depicts another example routine and lesson that teach a user to discriminate and match pitches using a melody map. In FIG. 16A, when a user touches or clicks on a melody map included in a user interface, the pitch module 203 generates a symbolically depicted sequence including two pitches and the user interface engine 217 updates the user interface to include two pitch indicators representing the two pitches (e.g., two lines on the melody map). When the user clicks on the play button located under one of two characters on the user interface, the pitch module 203 generates a melody sequence that includes two pitches and the execution module 205 plays the melody sequence as if the one of the characters is playing. The user then selects the character that played the same melody sequence as the symbolically depicted sequence. The determining engine 209 receives the selection of the character and determines whether the selection is correct. If the selection is correct, the execution module 205 plays the selected melody sequence as if the character is playing the sequence and the tracking module 207 increments a progress bar. Once the correct pitches (e.g. three pitches) are achieved, the tracking module 207 advances the user to a next level, for example, the routine in FIG. 16B (lesson 12). If the selection is incorrect, the tracking module 207 communicates with the user interface engine 217 to remove the character who played the incorrect sequence and highlight the correct character. When the user taps each of the two pitches shown in the pitch indicators (e.g., each line in the melody map), the user interface engine 217 highlights each pitch and the execution module 205 plays each pitch. The execution module 205 also plays the symbolically depicted sequence followed by playing the correct melody sequence as if the character played the melody sequence.

Figure 16B:
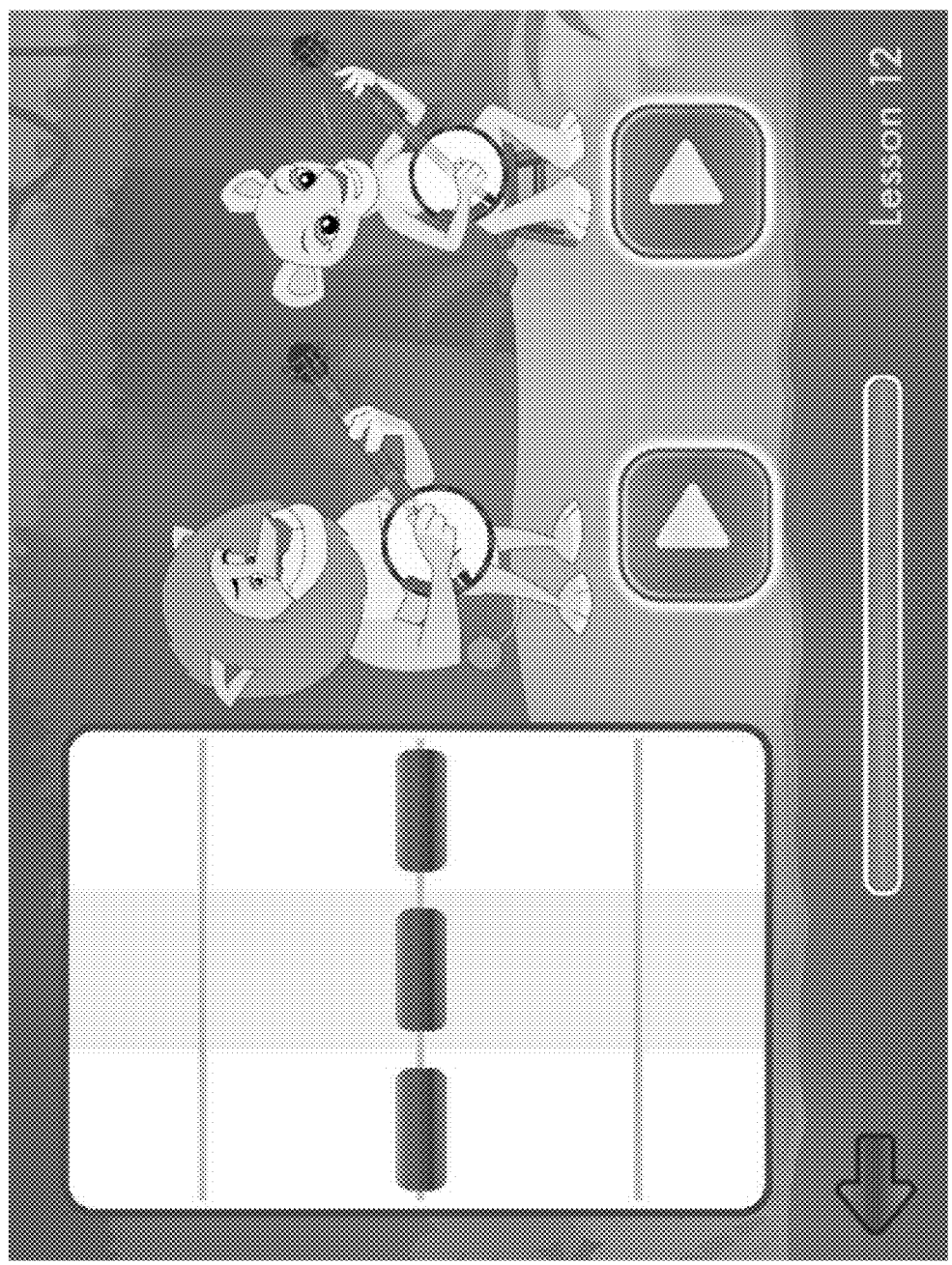
Figure 17A:
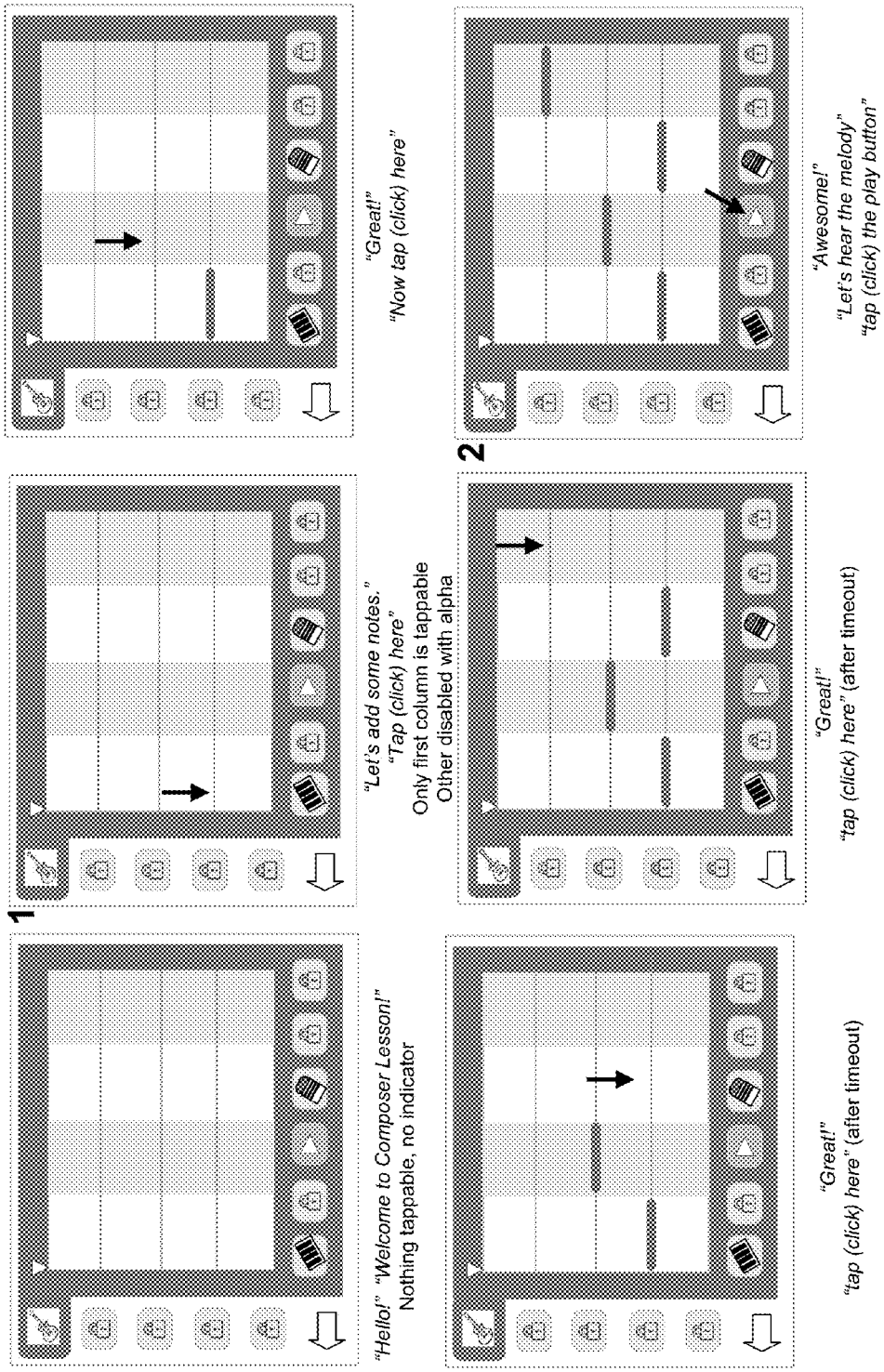
FIGS. 17A-E are graphic representations of a first example user interface for presenting a routine and corresponding lessons that teach a user how to create compositions in a composition studio.
Figure 17B:
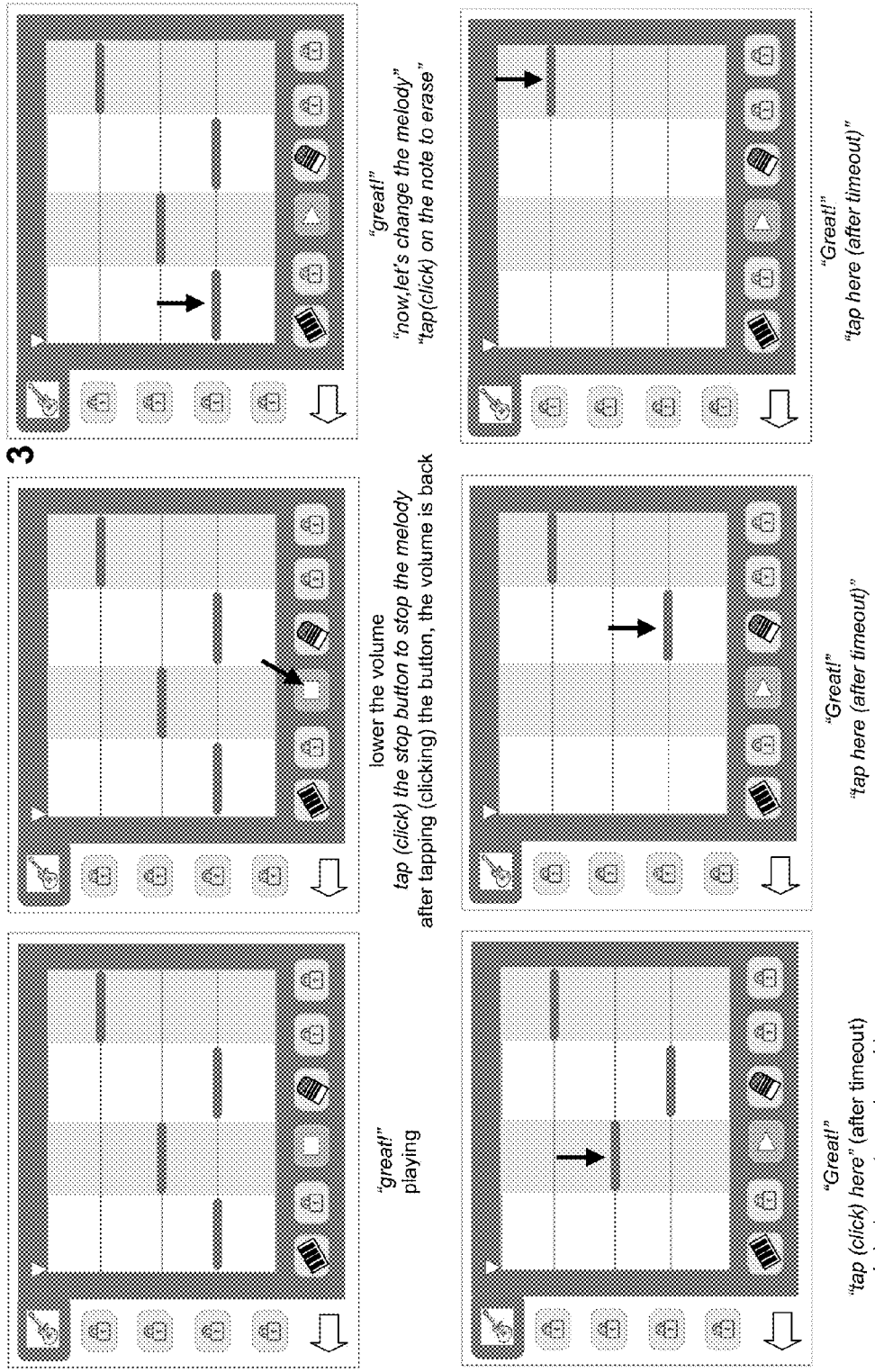
Figure 17C:
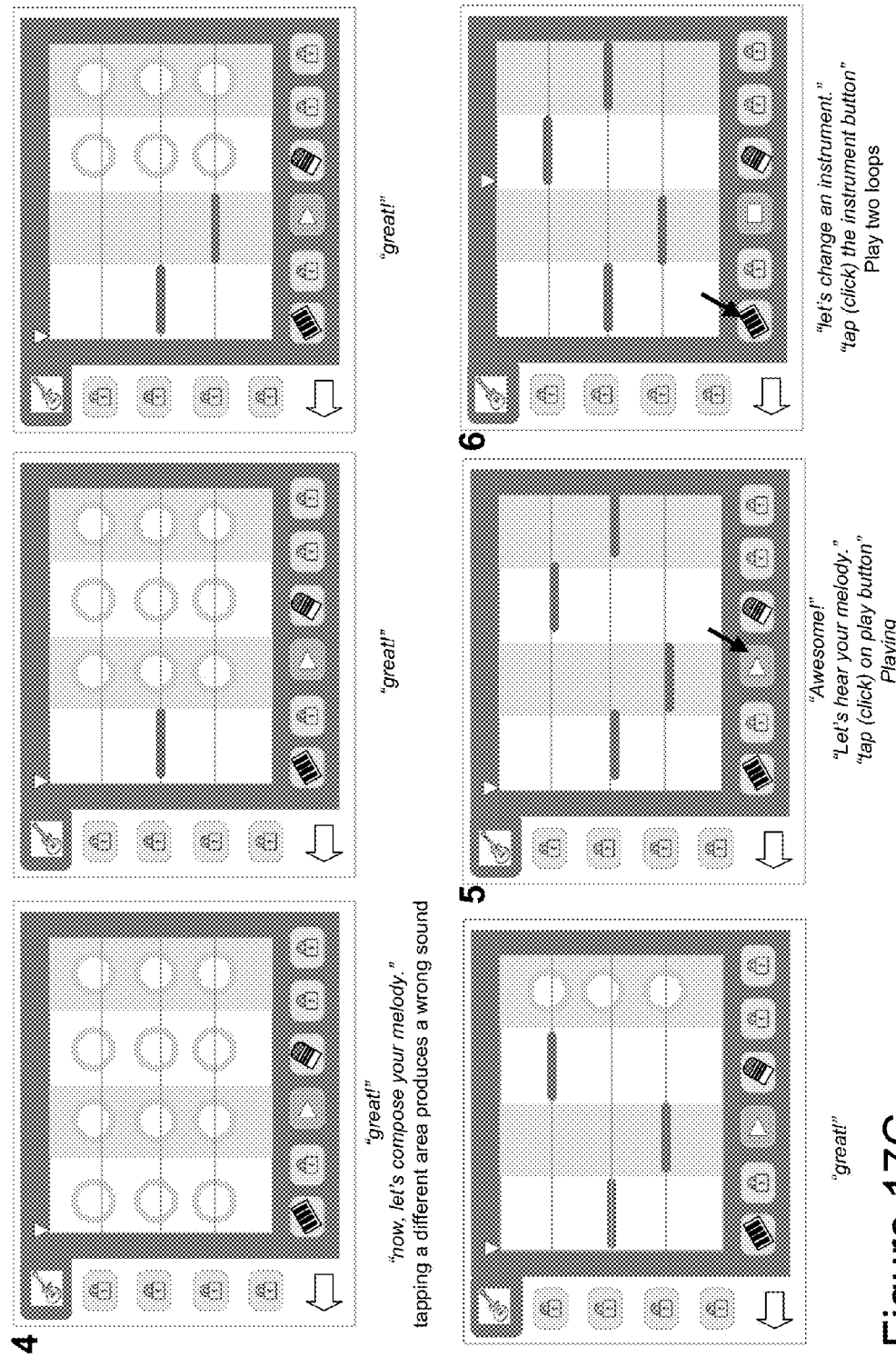
Figure 17D:
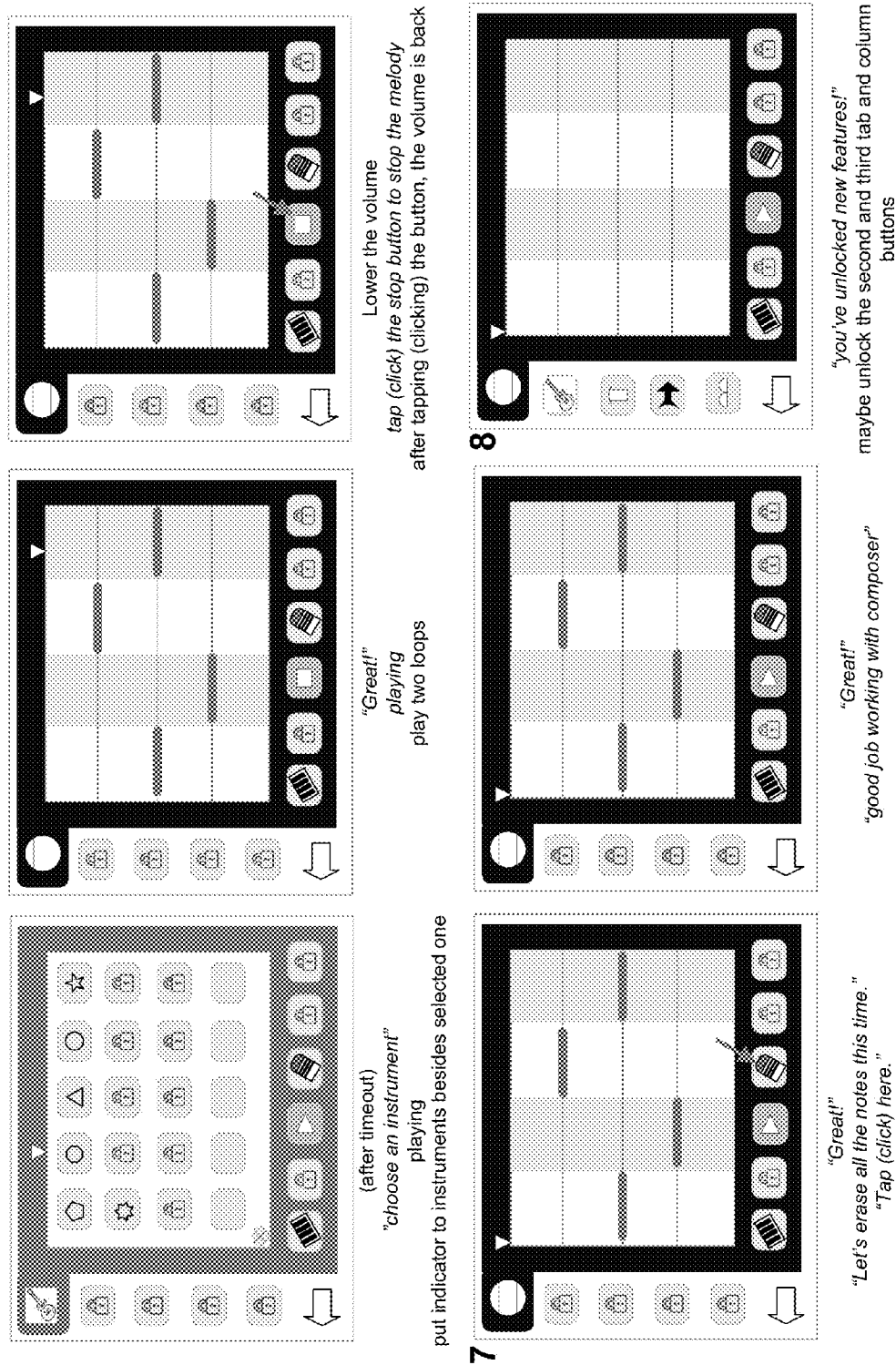
Figure 17E:
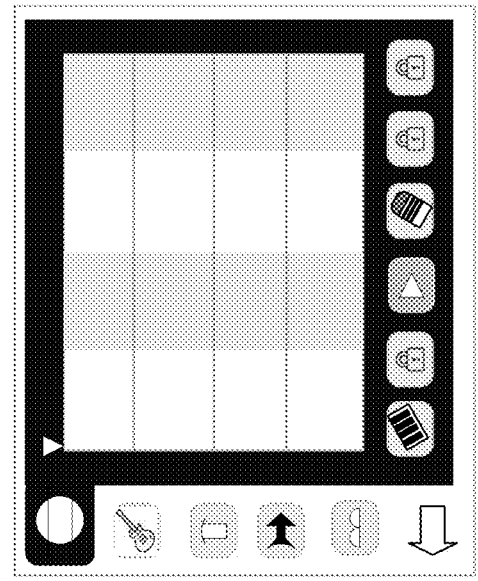
Figure 18A:
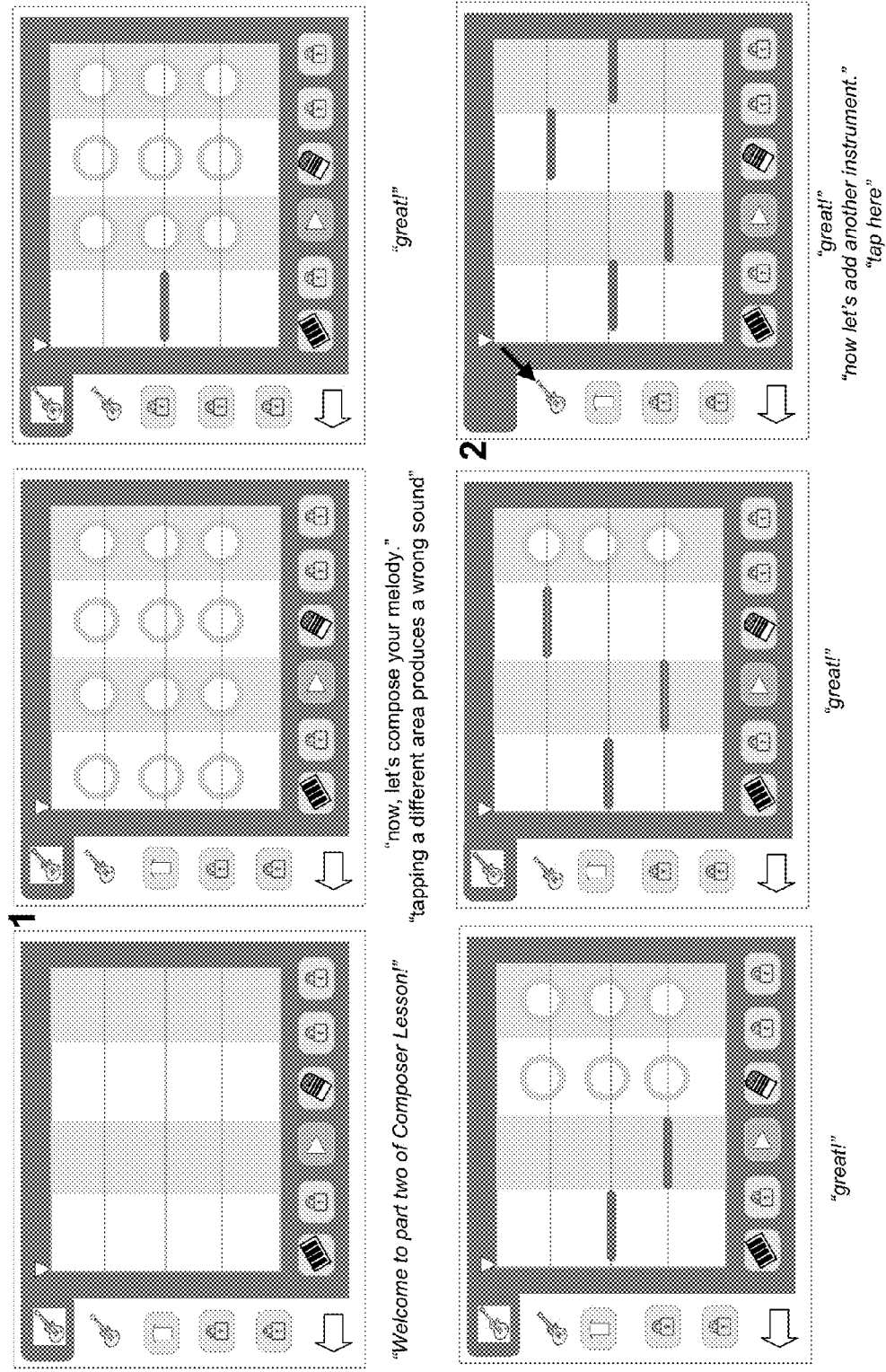
FIGS. 18A-E are graphic representations of a second example user interface for presenting a routine and corresponding lessons that teach a user how to create compositions in a composition studio.
Figure 18B:
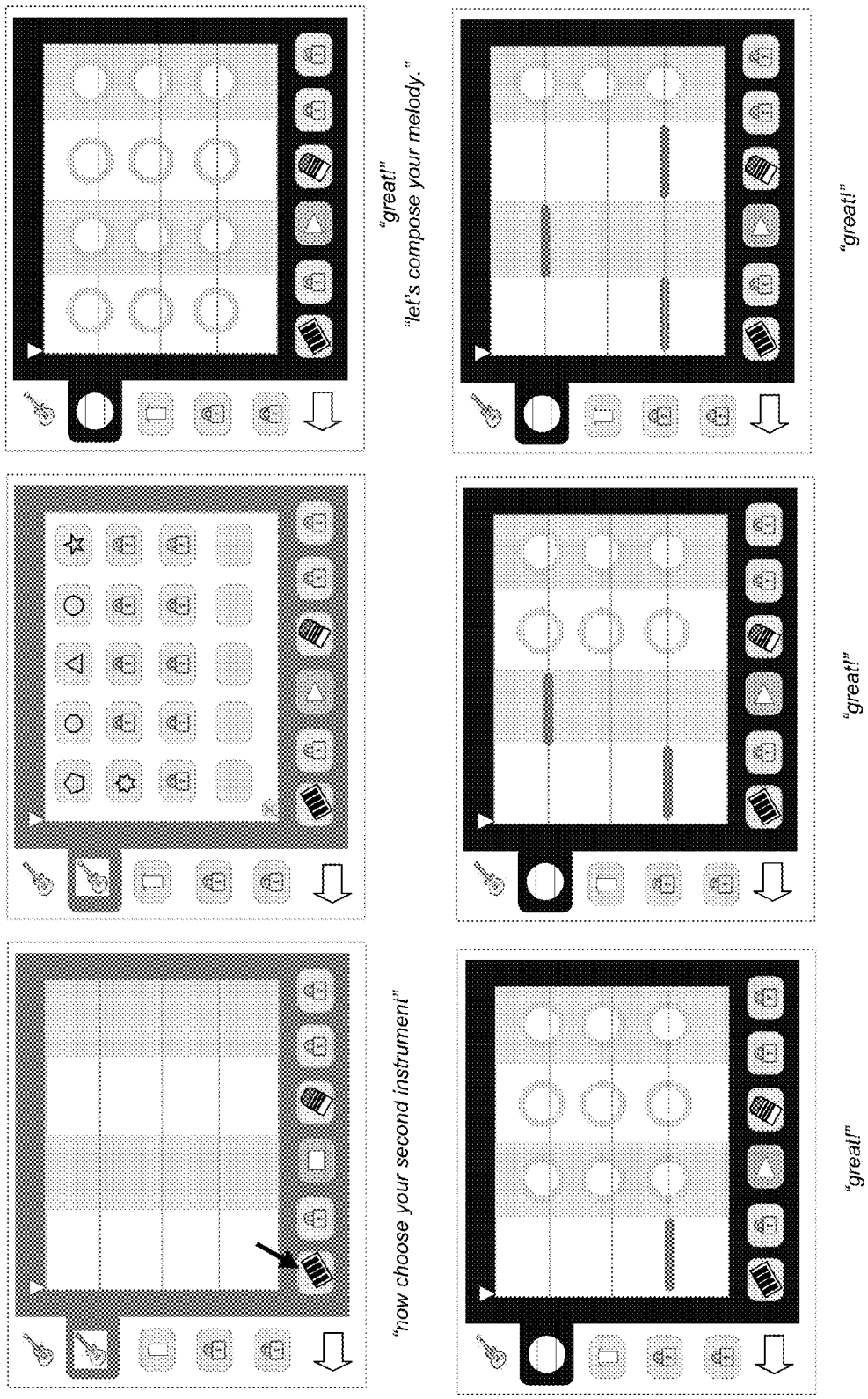
Figure 18C:
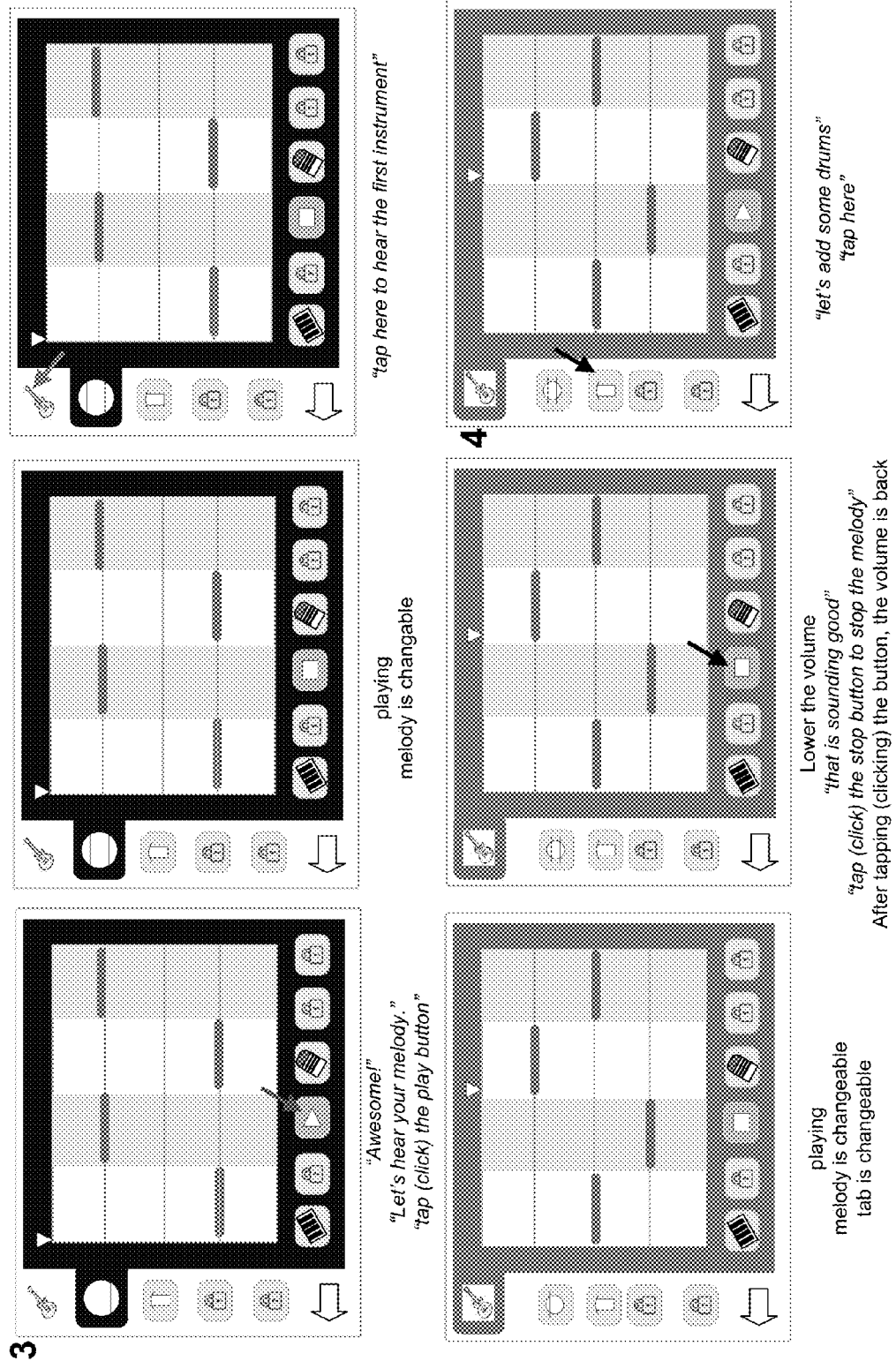
Figure 18D:
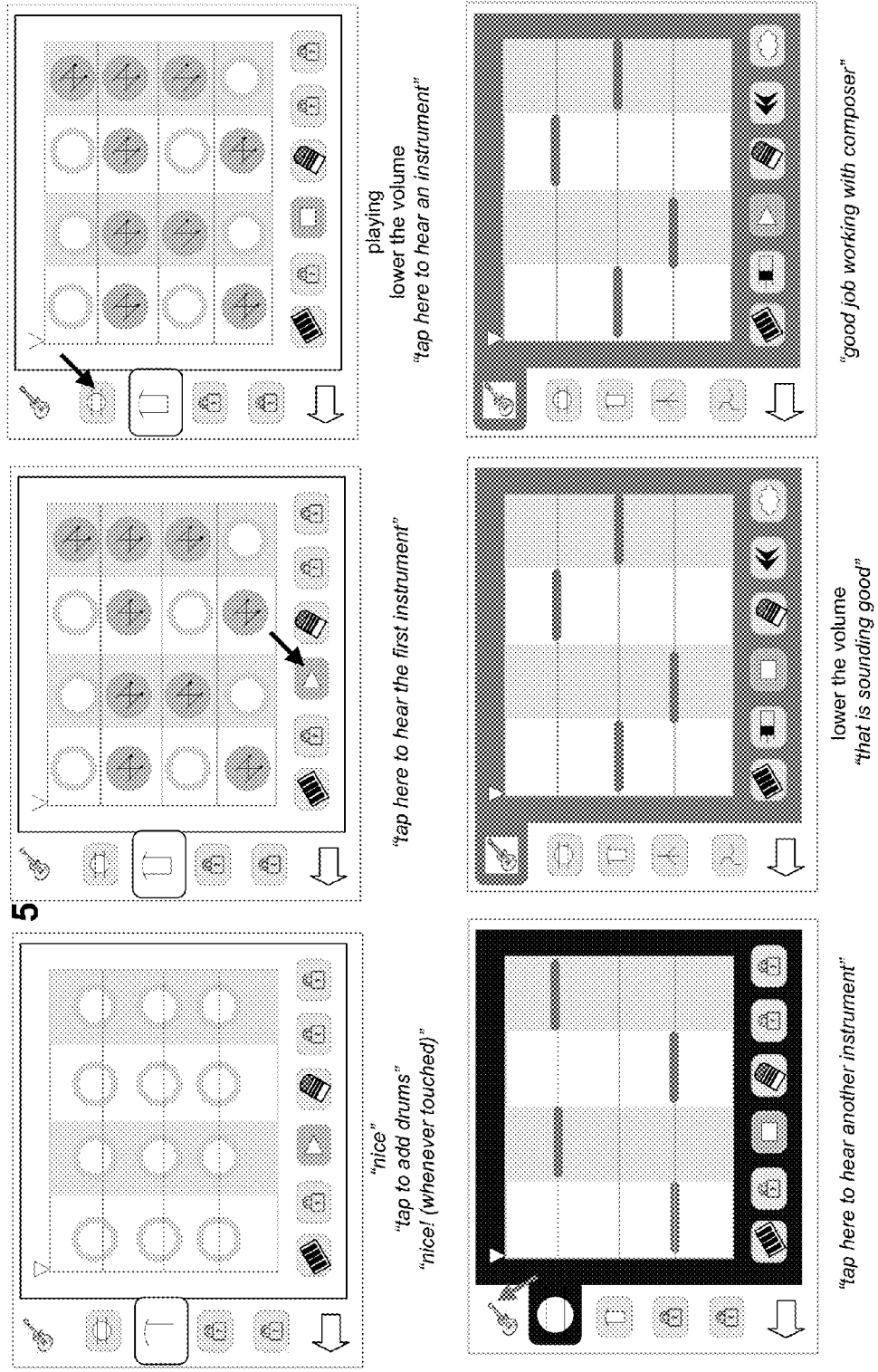
Figure 18E:
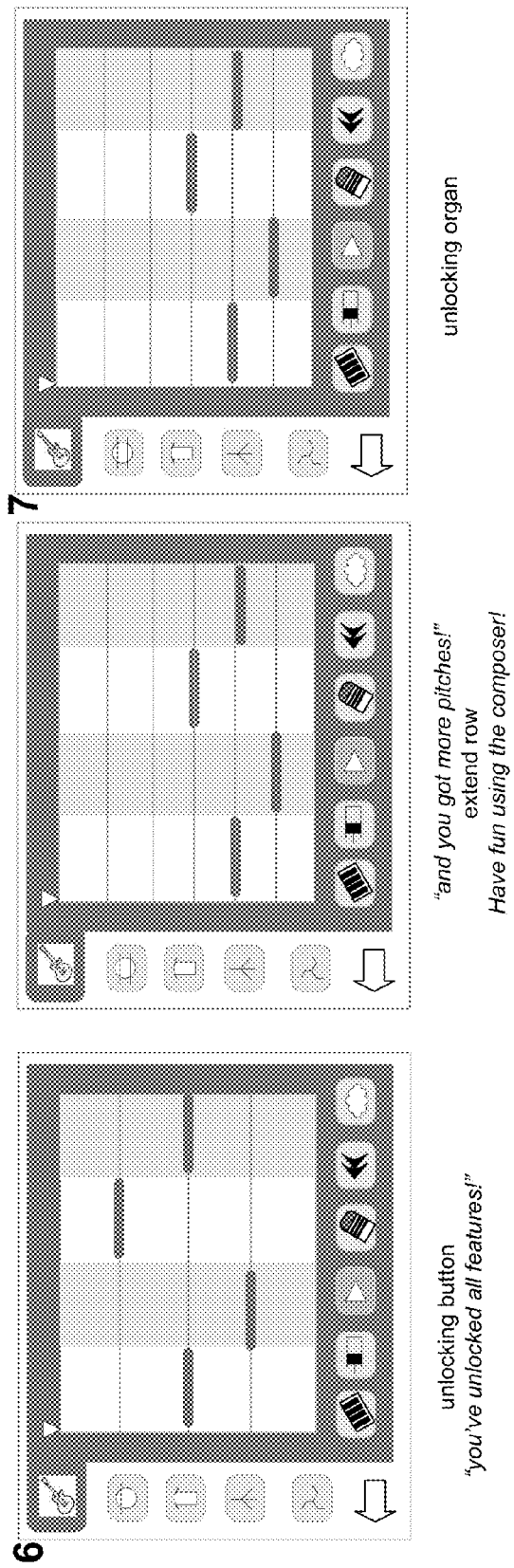

In FIG. 16B, the user interface engine 217 generates three pitch indicators representing three pitches on a user interface by adding a third column to the melody map in FIG. 16A, and the routine teaches the user to match the symbolically depicted sequence including the three pitches to a melody sequence played by one of the characters.

Figure 13A:
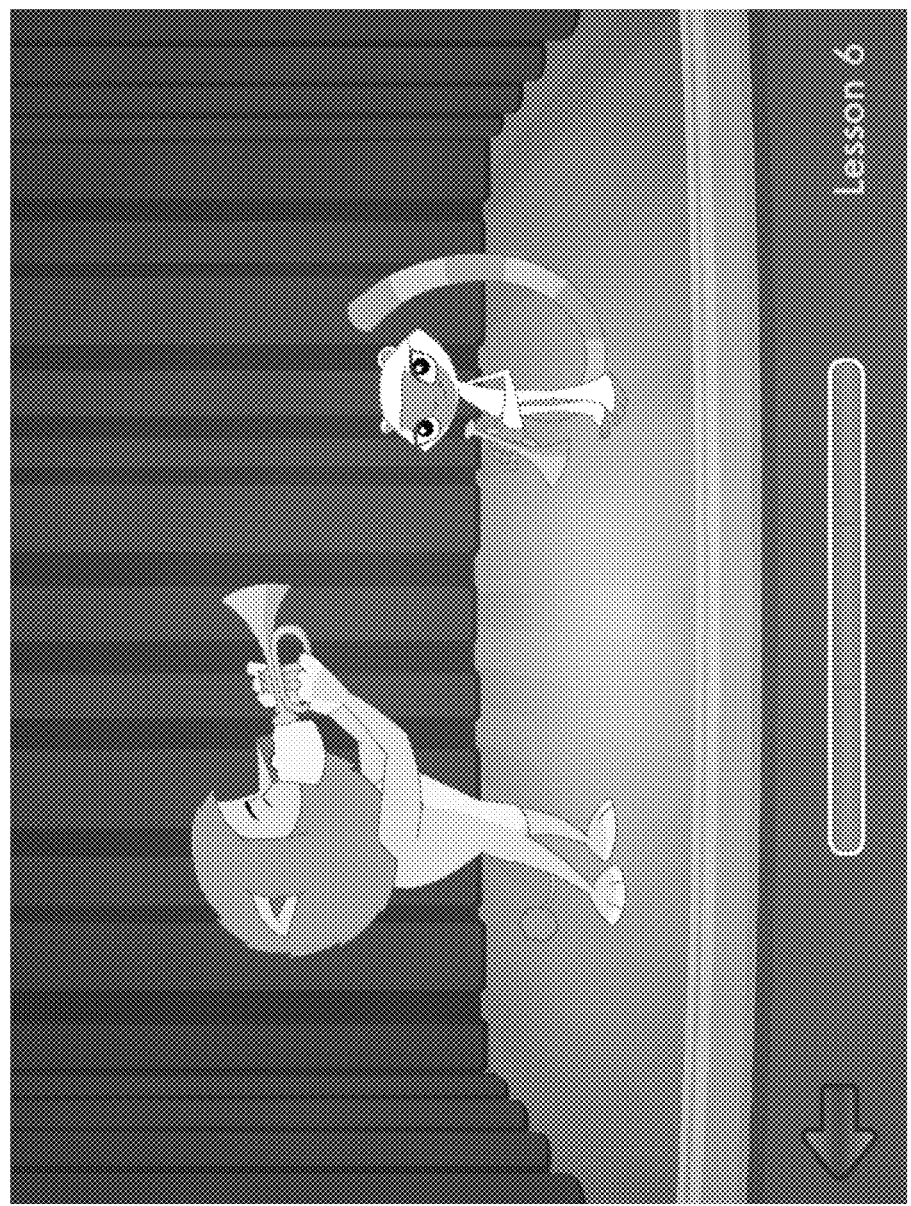
FIGS. 13A and 13B are graphic representation of a third example user interface for presenting a routine and corresponding lessons that teach a user to discriminate and match instances of musical pitch.

FIG. 13A illustrates a routine and corresponding lessons (lessons 5, 6 and 7) that teach a user to distinguish two pitches played by different characters on the same instrument. The pitch module 203 specifies and saves an interval (e.g., based on a selection from a user) that indicates a level for a first pitch frequency that is higher than a second pitch frequency.

Figure 13B:
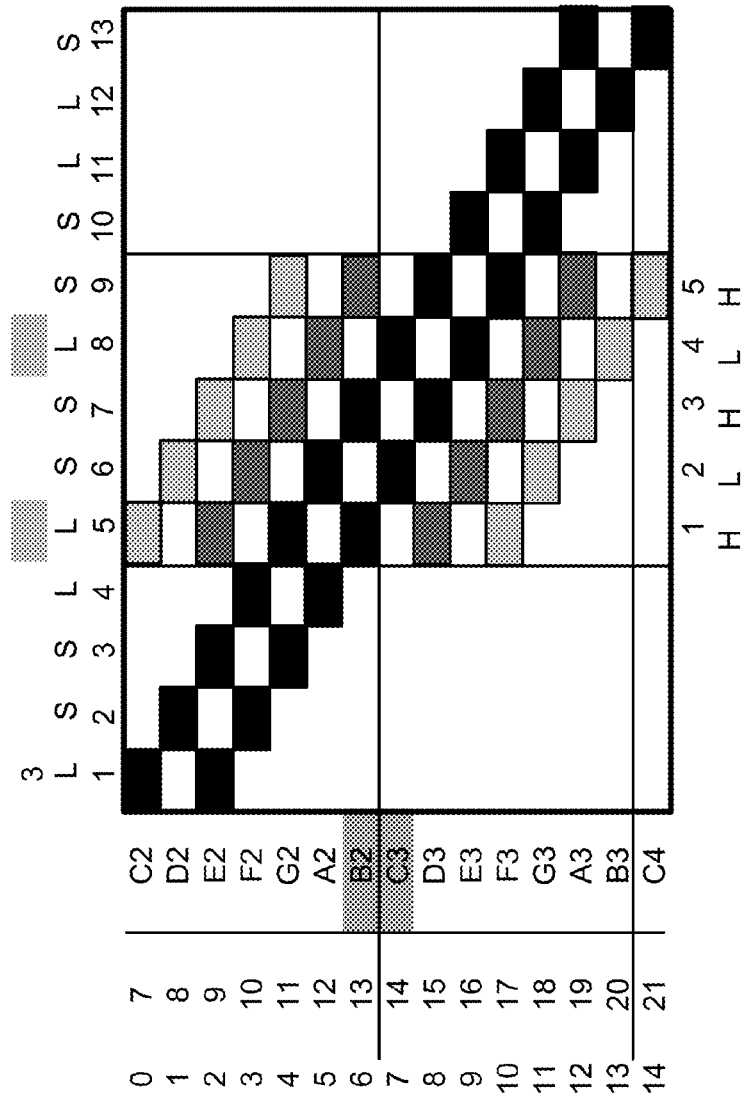

Examples of the intervals are depicted in FIG. 13B. In this example, as the user progresses through lesson 5 (FM1), lesson 6 (FM2) and lesson 7 (FM3), the discrimination becomes more challenging. The pitch module 203 generates a first training sequence including a first pitch with the first pitch frequency and a second training sequence including a second pitch with the second pitch frequency. For example, the pitch module 203 specifies a third interval. According to FIG. 13B, if the pitch module 203 generates a first training sequence having a C3 pitch, the pitch module 203 will also generate a second training sequence having an E3 pitch or an A2 pitch. The execution module 205 plays each of the two training sequences as if each of the two characters is play the same instrument. The user identifies which character is playing the sequence with a pitch frequency higher than another (e.g., the first training sequence). The determining engine 209 receives the response and determines whether the response is correct. If the response is correct, the tracking module 207 advances a progress indicator or advances the user to a next level. For example, the tracking module 207 advances to a next lesson where the interval is decreased and the pitch discrimination becomes more challenging. If the response is incorrect, the pitch module 203 increases the interval and regenerates two sequences based on the increased interval for the user to compare and match. For example, the pitch module 203 increases the interval from third to fifth at a next trial. If the user provides an incorrect answer again, the pitch module 203 further increases the interval, for example, from fifth to seventh. When the user's response is correct, the pitch module 203 will resume the saved interval, for example, from seventh to third.

In one embodiment, in addition to determining to increase the interval based on an incorrect response, the determining engine 209 also determines which pitch frequency (e.g., the first pitch frequency or the second pitch frequency) should be modified to increase the interval. In one embodiment, the determining engine 209 uses a stimulus to determine which pitch frequency should be modified. In one embodiment, the tracking module 207 receives the stimulus from the user and passes the stimulus to the determining engine 209. In another embodiment, the stimulus is predetermined. If the stimulus is "higher," the determining engine 209 determines that the higher pitch frequency of the two frequencies (e.g., the first pitch frequency) should be increased. For example, if a user responded incorrectly on distinguishing a C3 pitch and an E3 pitch, the pitch module 203 will generate a C3 pitch and a G3 pitch at the next trial to increase the interval from third to fifth. If the stimulus is "lower," the determining engine 209 determines that the lower pitch frequency of the two frequencies (e.g., the second pitch frequency) should be decreased. For example, if a user responded incorrectly on distinguishing a C3 pitch and an E3 pitch, the pitch module 203 will generates an A3 pitch and an E3 pitch at the next trial to increase the interval from third to fifth.

In the embodiment depicted in FIG. 13A, the pitch module 203 generates the two training sequences including two pitches played by two characters on the same instrument. The training sequences are melody sequences or symbolically depicted sequences. In another embodiment, the pitch module 203 generates at least two training sequences. Each of the at least two training sequences includes at least one pitch played by a character on an instrument. In one embodiment, the at least two training sequences correspond to multiple characters and multiple instruments.

The notification module 211 is software including routines for notifying a user whether a selection from the user is correct responsive to receiving a determination from the determining engine 209. In one embodiment, the notification module 211 is a set of instructions executable by the processor 235 to provide the functionality described below for notifying the user whether the selection from the user is correct responsive to receiving the determination from the determining engine 209. In another embodiment, the notification module 211 is stored in the memory 237 of the teaching server 101 and is accessible and executable by the processor 235. The notification module 211 is adapted for cooperation and communication with the processor 235 and other components of the teaching server 101 via the bus 220.

In one embodiment, responsive to receiving a determination from the determining engine 209, the notification module 211 communicates with the user interface engine 217 to inform a user of an incorrect selection or acknowledge a correct selection by generating graphical data for displaying a notification message. For example, the notification module 211 receives a negative determination from the determining engine 209 and generates the message "Oops! Try again!" on a user interface to tell a user that the user made a wrong selection.

In another embodiment, the notification module 211 generates and transmits an audio notification to a user. For example, once the determining engine 209 determines that a selection of a symbolically depicted sequence from a user matches a melodic sequence in FIG. 11, the notification module 211 generates a spoken message to the user to confirm that the user's selection is correct. Otherwise, the notification module 211 generates a spoken admonition to notify the user of the incorrect selection.

In one embodiment, the notification module 211 also simulates a character to generate and transfer a notification to a user. For example, the notification module 211 plays a sound "You did great!" for a user as if a character (e.g., a lion) is celebrating with the user once the determining engine 209 determines that the user made a correct selection.

In some embodiments, the notification module 211 sends a notification of the user that summarizes the user's activities. For example, every week the notification module 211 sends an email to the user describing how many levels the user completed, instruments that were accessed, a comparison of the user to other users that use the application, etc.

The game module 213 is software including routines for generating a game and providing a user with access to the game. In one embodiment, the game module 213 is a set of instructions executable by the processor 235 to provide the functionality described below for generating the game and providing the user with access to the game. In another embodiment, the game module 213 is stored in the memory 237 of the teaching server 101 and is accessible and executable by the processor 235. The game module 213 is adapted for cooperation and communication with the processor 235 and other components of the teaching server 101 via the bus 220.

The game module 213 generates a game for a user to practice and extend skills learned from routines and corresponding lessons. In one embodiment, the game module 213 generates the game and unlocks the game for the user to access once the user has completed specific routines and lessons. The game module 213 provides the game to the user as a trophy. For example, responsive to the tracking module 207 updating a progress indicator to indicate that a user has successfully distinguished a first training sequence from a second training sequence that has a first level of pitch frequency difference from the first training sequence, the game module 213 provides a game for the user to distinguish between sequences having a second level of pitch frequency difference.

Figure 20:
FIG. 20 is a graphic representation of an example user interface for playing a game.

In one embodiment, the game module 213 provides a game to a user in a play area as depicted in FIG. 20. The play area in FIG. 20 is composed of three different games. Each game is based on a routine generated by the routine module 201. The game module 213 generates the first game based on a routine that teaches a user to distinguish two pitches played by different characters on the same instrument. FIG. 13A illustrates a user interface associated with the lesson. The game module 213 changes the interval between two pitches across different levels and also provides the discrimination of pitches across two different instruments. In some embodiments, level 1 uses the fifth interval. For example, if one pitch is C3, the other pitch is G3 or F2. Level 2 uses the fourth interval. For example, if one pitch is C3, the other pitch is F3 or G2. Level 3 uses octaves. For example, if one pitch is C3, the other pitch is C4 or C2. Level 4 uses the third interval. For example, if one pitch is C3, the other pitch is E3 or A2. Level 5 uses the second interval. For example, if one pitch is C3, the other pitch is D3 or B2. Level 6 uses the sixth interval. For example, if one pitch is C3, the other pitch is A3 or E2. In addition, the discrimination of a higher or lower pitch occurs across two different instruments, whereas in the previous levels, a different pitch is played on the same instrument.

The game module 213 generates the second and third games based on the routines depicted in FIGS. 11, 14A, 14B, 15, 16A and 16B, which teach a user to produce a matching pitch using a melody map. The game module 213 uses two parameters in each of the second and third games. One parameter is a number of columns (e.g., pitches, notes) in a melody map. Another parameter is a number of switches in the melody map. A switch is the change of a note. For example, if the number of columns is four and a melody sequence of notes is C→C→C→C, there is no switch. If the melody is C→C→D→E, the number of switches is two. The game module 213 changes the number of columns and the number of switches across levels in the second and third games. For example, the game module 213 uses three columns in level one and two, four columns in levels three and four, five columns in level five and six, etc. In another example, the game module 213 uses zero to two switches in level one and two, two switches in level three, three switches in level four, etc.

The creation module 215 is software including routines for providing a user a composition studio for creating compositions. In one embodiment, the creation module 215 is a set of instructions executable by the processor 235 to provide the functionality described below for providing the user the composition studio for creating compositions. In another embodiment, the creation module 215 is stored in the memory 237 of the teaching server 101 and is accessible and executable by the processor 235. The creation module 215 is adapted for cooperation and communication with the processor 235 and other components of the teaching server 101 via the bus 220.

In one embodiment, the routine module 201 generates a routine and instructs the creation module 215 to provide at least one lesson that teaches a user how to compose in a composition studio (e.g., a guided tutorial for the composition studio) based on the routine. For example, in FIGS. 17A-E, the creation module 215 teaches a user to add notes, to start playing, to stop playing, to erase a note, to erase all notes and to change instruments. In FIGS. 18A-E, the creation module 215 teaches a user to add additional instruments, add a drum set, and play two instruments and a drum set simultaneously.

In one embodiment, the creation module 215 provides a user with access to a composition studio to create compositions in response to the tracking module 207 updating a progress indicator to indicate that the user has finished a lesson and the execution module 205 unlocking one or more musical instruments for the user. For example, after the tracking module 207 indicates that a user has correctly selected a symbolically depicted sequence that matches a melodic sequence played by one of the characters (e.g., as depicted in FIG. 16B) and the execution module 205 unlocks an instrument (e.g., a piano, a bass), the creation module 215 allows the user to access the composition studio to create a composition.

Figure 19A:
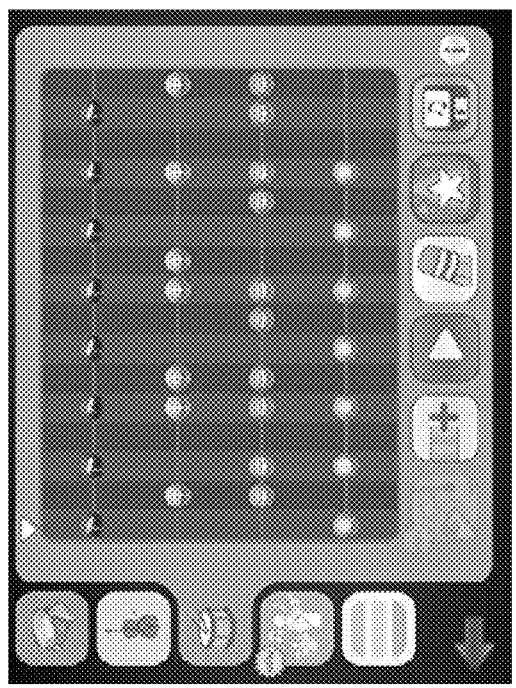
FIGS. 19A and 19B are graphic representations of a third example user interface for presenting a routine and corresponding lessons that teach a user to create compositions in a composition studio.
Figure 19A:
Figure 19A:
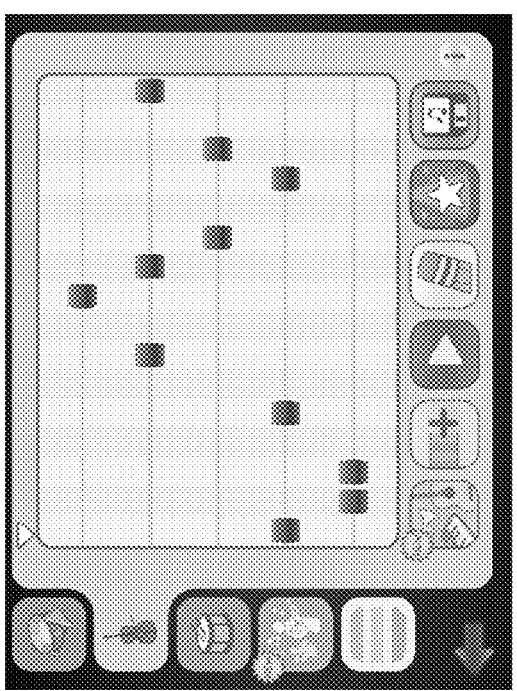
Figure 19B:
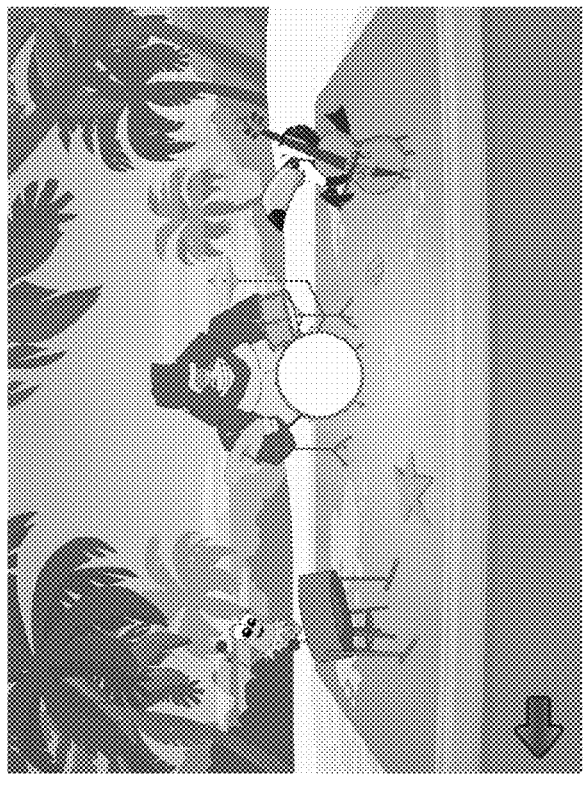
Figure 19B:

In another embodiment, the creation module 215 provides a user full access to the composition studio after the tracking module 207 indicates that the user has finished specific routines and corresponding lessons. For example, the creation module 215 provides full access of the composition studio to a user if the tracking module 207 shows that the user has completed routines and lessons in FIGS. 17A-E and 18A-E. Initially, the creation module 215 limits the user's access to the composition studio (e.g., the user can only use one instrument in the composition studio). After the user completed specific lessons, the creation module 215 makes the composition studio completely open to a user to create compositions. As depicted in FIGS. 19A and 19B, the user can create musical scores utilizing chosen musical instruments and a drum set including a snare, high hat, cymbal and a bass drum, lay down sequences that range from as few as four notes for each instrument to as many as sixteen, add a musical "backing band" from a choice of nine and play each instrument separately or altogether. Once a composition is created, the creation module 215 helps the user not only to hear the composition but also to see each instrument precisely play the composition. By touching a star icon that is second from last in FIGS. 19A and 19B, the user can see and hear a cartoon character accurately play the composition for one instrument, two instruments, or all instruments together.

The user interface engine 217 is software including routines for generating a user interface that displays routines and corresponding lessons, user inputs and other information (e.g. a trophy, a notification). In one embodiment, the user interface engine 217 is a set of instructions executable by the processor 235 to provide the functionality described below for generating the user interface. In another embodiment, the user interface engine 217 is stored in the memory 237 of the teaching server 101 and is accessible and executable by the processor 235. The user interface engine 217 is adapted for cooperation and communication with the processor 235 and other components of the teaching server 101 via the bus 220.

Figure 21:
FIG. 21 is a graphic representation of an example user interface for displaying a list of performance indicators in one embodiment.

In one embodiment, the user interface engine 217 generates graphical data for displaying a user interface that includes a routine and corresponding lessons. In another embodiment, the user interface engine 217 generates a user interface to receive a user input, for example, a selection of a symbolically depicted sequence that matches a melody sequence. In yet another embodiment, the user interface engine 217 generates graphical data for displaying a notification. For example, the user interface engine 217 generates a notification on a user interface to notify a user of an incorrect selection. In yet another embodiment, the user interface engine 217 generates a graphical representation of a trophy. For example, the user interface engine 217 generates a list of graphical icons in FIG. 21 that represent a list of trophies. The trophies represent different consequences of a user completing different lessons. In one embodiment, the user interface engine 217 generates a graphical representation of a trophy that corresponds to a game or an instrument. For example, one of the trophies in FIG. 21 is opening up a game in a play area. Another trophy in FIG. 21 is associated with unlocking an instrument in a create area.

FIG. 22 illustrates a list of the table of trophies earned in lessons and games in the application. For example, the application includes three games that appear in different lessons (lessons, 7, 10 and 12, respectively). In addition, the user receives different instruments or backing bands as trophies in different levels.

Example Methods

Figure 3:
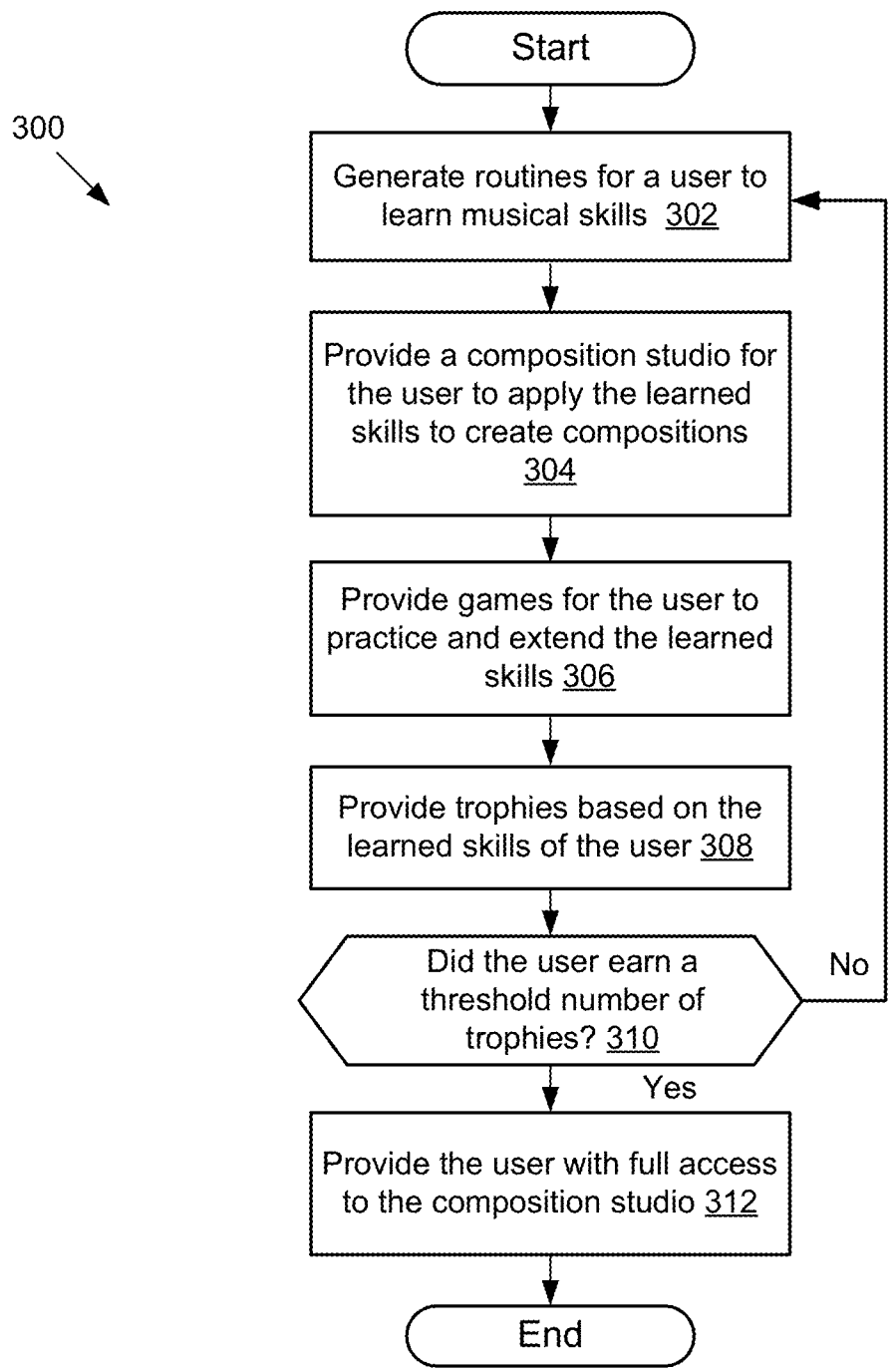
FIG. 3 is a flowchart of an example method for teaching a user to match and discriminate musical pitch.

Referring now to FIGS. 3, 4, 5A, 5B, 6, and 7, various example methods and graphic representations of example user interfaces of the specification will be described. FIG. 3 includes a flowchart 300 of an example method for using a training application 103 to teach a user to match and discriminate musical pitch. The training application 103 includes a routine module 201, an execution module 205, a game module 213 and a creation module 215.

The routine module 201 generates 302 routines for a user to learn musical skills. In one embodiment, the routine module 201 generates the routines as lessons and games that present, evaluate, provide feedback and cumulatively sequence instructions related to teaching musical pitch. The creation module 215 provides 304 a composition studio for the user to apply the learned skills to create compositions. The game module 213 generates and provides 306 games for the user to practice and extend the user's learned skills. The routine module 201 instructs the execution module 205 or the game module 213 to provide 308 trophies based on the learned skills of the user. The trophies represent different consequences of a user completing different lessons. For example, the execution module 205 unlocks an instrument for a user as a trophy after the user completes a first set of routines and lessons. The game module 213 generates a game and provides a user with access to the game after the user completes a second set of routines and lessons. The determining engine 209 determines 310 whether the user earned a threshold number of trophies. If not, the method 300 repeats steps 302-308. If yes, the user interface engine 217 provides 312 the user with full access to the composition studio. Initially, the creation module 215 limits the user's access to the composition studio (e.g., the user can only use one instrument in the composition studio). After the user completes specific lessons, the creation module 215 makes the composition studio completely open to a user to create compositions.

Figure 4:
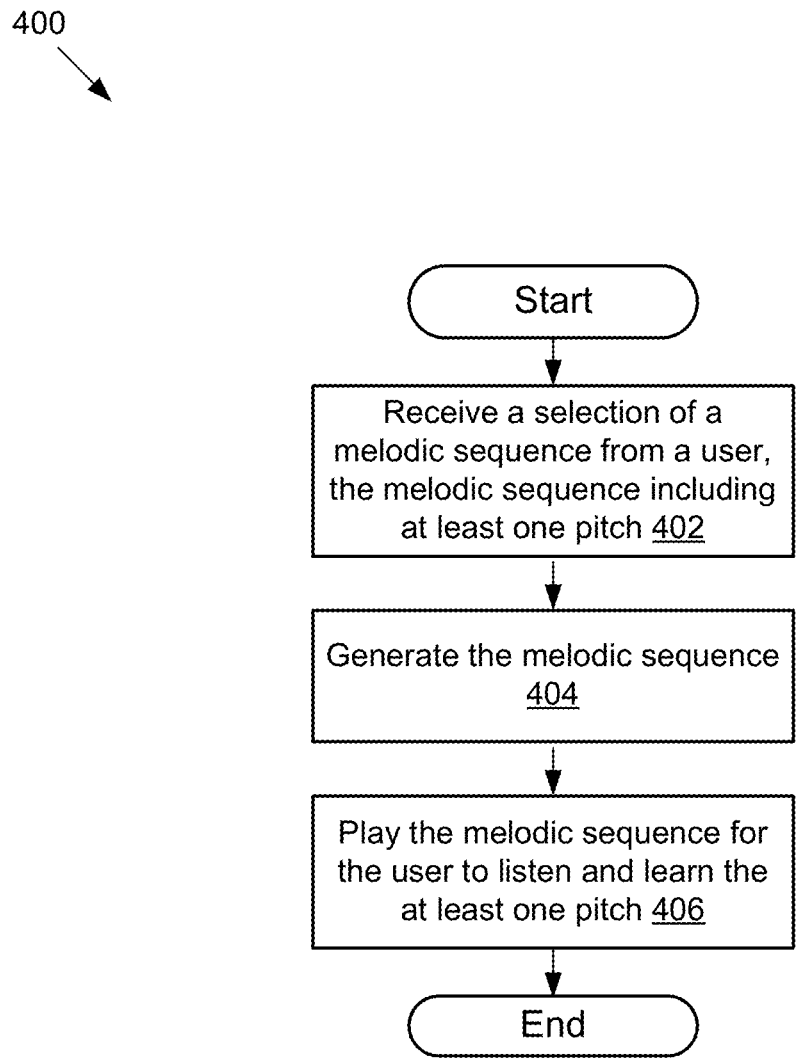
FIG. 4 is a flowchart of an example method for teaching a user to listen and learn musical pitch.

FIG. 4 includes a flowchart of an example method 400 for using a training application 103 to teach a user to listen and learn a pitch. The training application 103 includes a routine module 201, a pitch module 203, an execution module 205 and a tracking module 207.

The tracking module 207 receives 402 a selection of a melodic sequence from a user and the pitch module 203 generates 404 the melodic sequence. The melodic sequence includes at least one pitch. The execution module 205 plays 406 the melodic sequence for the user to listen and learn the at least one pitch. For example, each time when a user selects a play button positioned under a cartoon character (e.g., the lion in FIG. 9), the pitch module 203 generates a melodic sequence including a single pitch and the execution module 205 plays the melodic sequence for the user as if the lion plays the pitch. Examples of graphic representation for the method 400 are depicted in FIGS. 9 and 12.

Figure 5A:
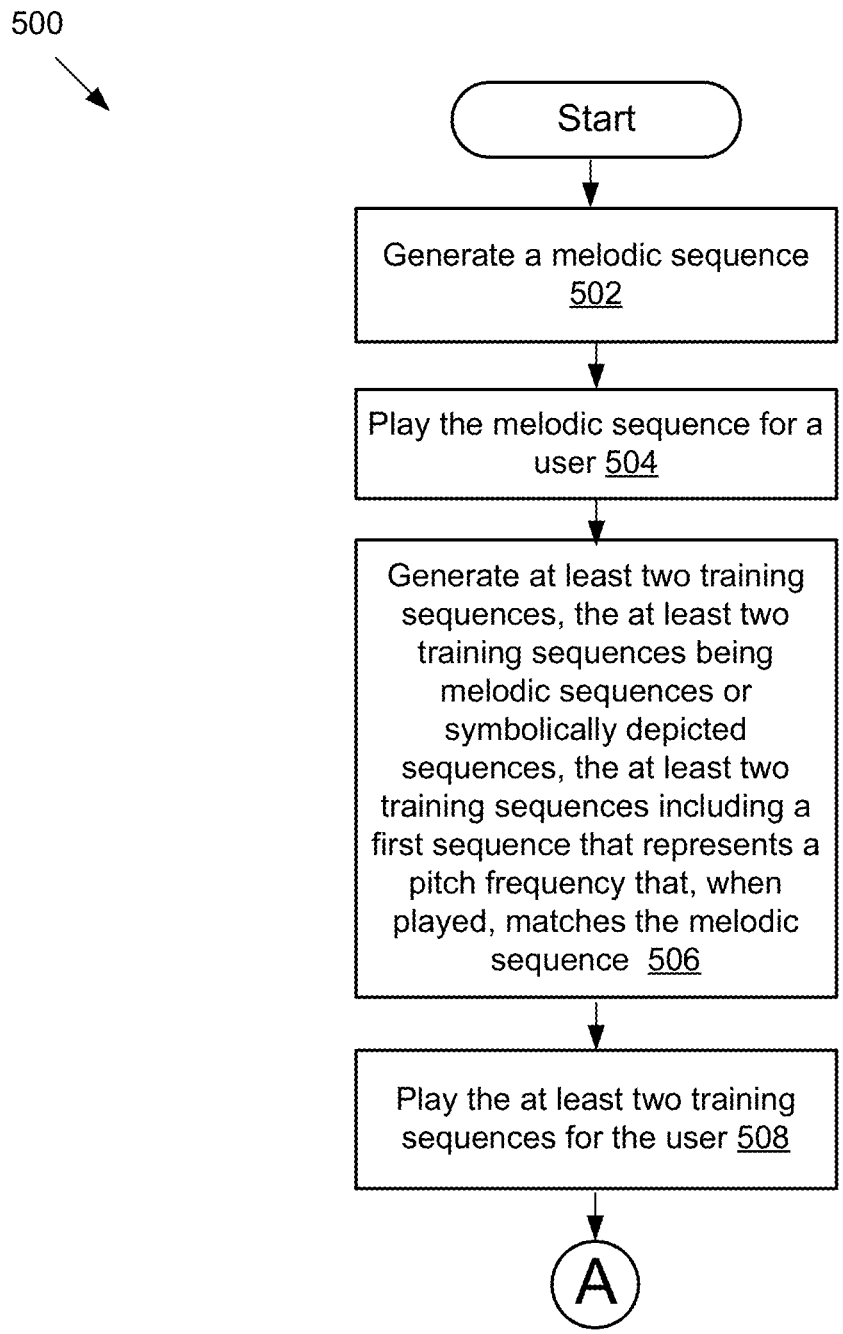
FIGS. 5A, 5B, 6 and 7 are flowcharts of example methods for teaching a user to discriminate and match musical pitch.
Figure 5B:
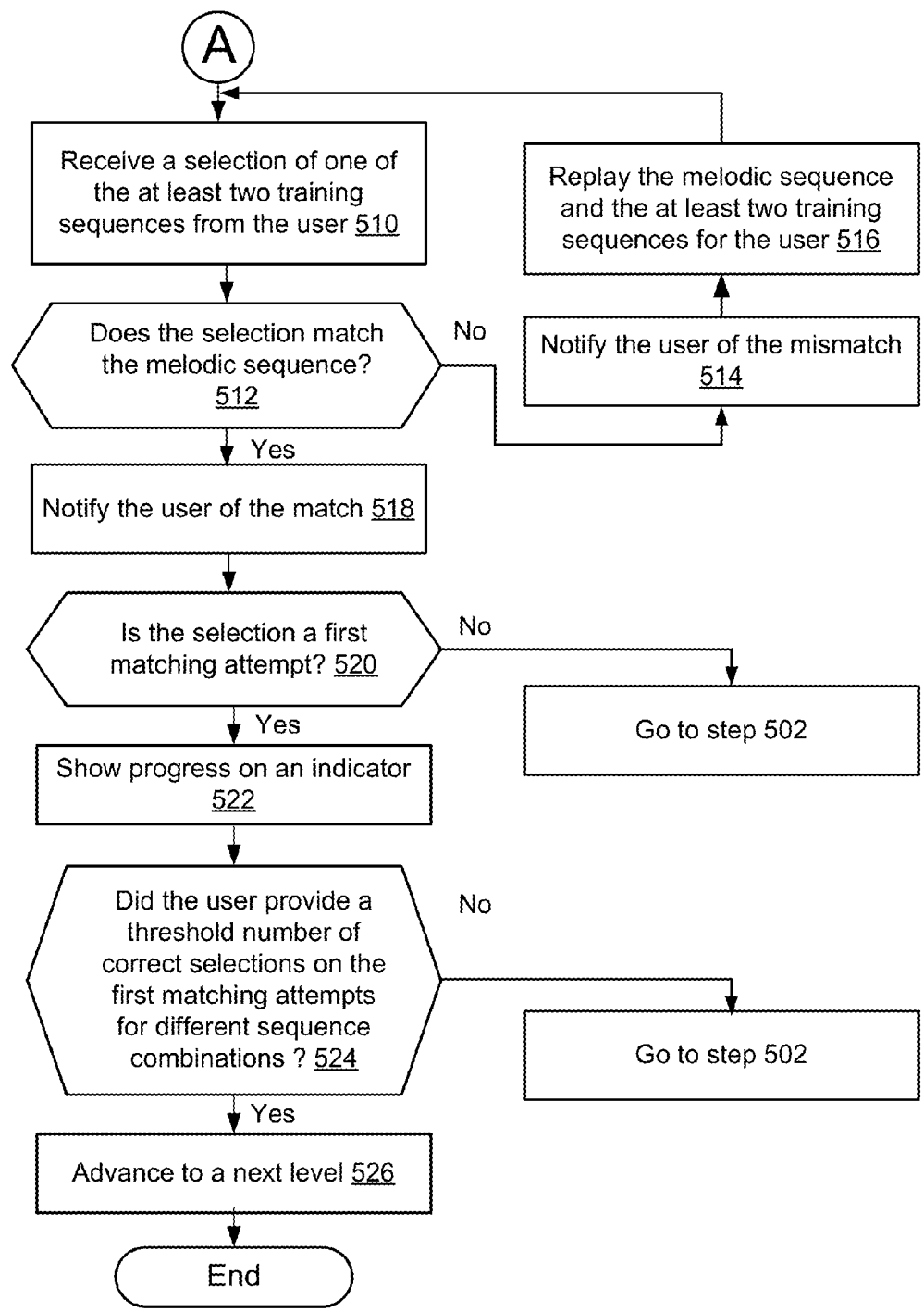

FIGS. 5A and 5B include a flowchart of an example method 500 for using a training application 103 to teach a user to discriminate and match musical pitch. The training application 103 includes a routine module 201, a pitch module 203, an execution module 205, a tracking module 207, a determining engine 209 and a notification module 211.

The pitch module 203 generates 502 a melodic sequence. For example, a user taps a button to trigger the pitch module 203 to generate a melodic sequence. The execution module 205 plays 504 the melodic sequence for the user. The pitch module 203 generates 506 at least two training sequences, the at least two training sequences being melodic sequences or symbolically depicted sequences, the at least two training sequences including a first sequence that represents a pitch frequency that, when played, matches the melodic sequence. The execution module 205 plays 508 the at least two training sequences for the user. The execution module 205 can repeatedly play the sequences for the user to compare.

Referring now to FIG. 5B, the tracking module 207 receives 510 a selection of one of the at least two training sequences from the user and transmits the selection to the determining engine 209. The determining engine 209 compares the selected training sequence to the melody sequence and determines 512 whether the selected training sequence matches the melodic sequence. If the training sequence does not match, the notification module 211 notifies 514 the user of the mismatch. For example, the notification module 211 instructs the user interface engine 217 to generates graphical data for displaying the message "Oops! Try again!" to tell a user that the user made a wrong selection. The execution module 205 replays 516 the melodic sequence and the at least two training sequences for the user so that the user can compare the sequences again. The tracking module 207 again receives 510 a selection of one of the at least two training sequences from the user. If there is a match, the notification module 211 notifies 518 the user of the match.

The determining engine 209 determines 520 whether the selection is a first matching attempt. If the selection is not a first matching attempt, the method 500 goes to step 502 to generate a different sequence combination for the user to compare and match. Otherwise, the tracking module 207 shows 522 the user's progress on an indicator. For example, the tracking module 207 updates a progress bar by one space. The determining engine 209 then determines 524 whether the user provided a threshold number (e.g. three) of correct selections on the first attempts for different sequence combinations. If the number of correct selections does not reach the threshold number, the method 500 goes to step 502 to generate a different sequence combination for the user to compare and match. Otherwise, the tracking module 207 advances 526 to a next level. In one embodiment, advancing to the next level includes starting a new routine and corresponding lesson, unlocking a musical instrument, generating a game and generating a graphical representation of a trophy. Examples of graphic representations of the method 500 are depicted in FIGS. 10, 11, 14A, 14B and 15.

Figure 6:
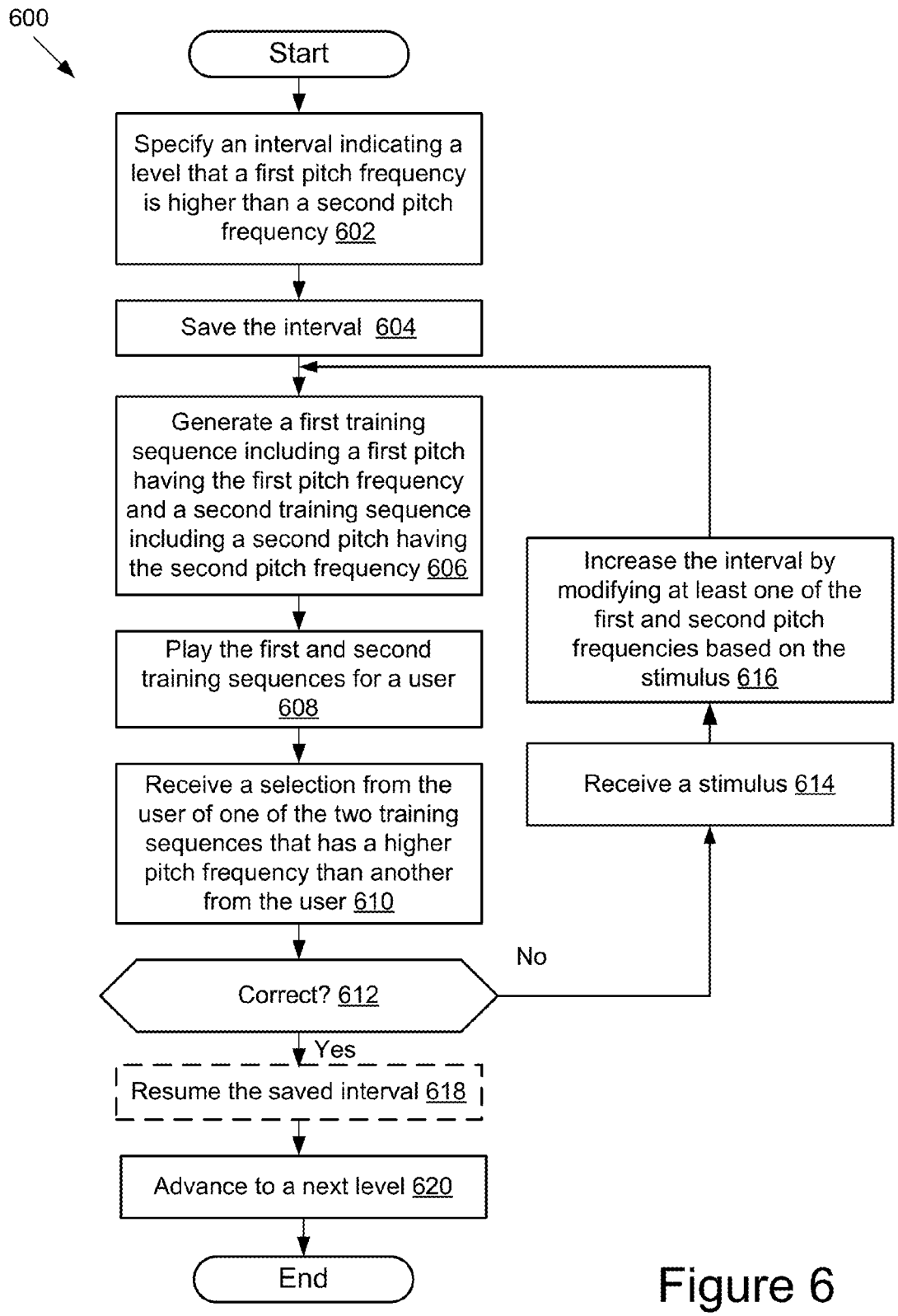

FIG. 6 includes a flowchart of an example method 600 for using a training application 103 to teach a user to discriminate and match musical pitch. The training application 103 includes a routine module 201, a pitch module 203, an execution module 205, a tracking module 207 and a determining engine 209.

The pitch module 203 specifies 602 an interval indicating a level that a first pitch frequency is higher than a second pitch frequency. The pitch module 203 saves 604 the interval. The pitch module 203 generates 606 a first training sequence including a first pitch with the first pitch frequency and a second training sequence including a second pitch with the second pitch frequency. For example, the pitch module 203 specifies a third interval. If the pitch module 203 generates a first training sequence having a C3 pitch, the pitch module 203 will also generate a second training sequence having an E3 pitch or an A2 pitch. The execution module 205 plays 608 the first and second training sequences for a user to listen to. The tracking module 207 receives 610 a selection from the user of one of the two training sequences that has a higher pitch frequency than another from the user and transmits the selection to the determining engine 209.

The determining engine 209 determines 612 whether the selection is correct. If incorrect, the determining engine 209 determines to increase the interval. The tracking module 207 receives 614 a stimulus. The pitch module 203 increases 616 the interval by modifying at least one of the first and second pitch frequencies based on the stimulus. Steps 606-612 repeat for the user to compare and discriminate two new sequences generated based on the increased interval. For example, the determining engine 209 determines to increase the interval from third to fifth based on an incorrect selection. If the tracking module 207 receives a higher stimulus, the determining engine 209 determines that the higher pitch frequency of the two frequencies (e.g., the first pitch frequency) should be increased. The pitch module 203 generates a C3 pitch and a G3 pitch to increase the interval from third to fifth. The user compares and discriminates the C3 pitch and the G3 pitch. If correct, the pitch module 203 resumes 618 the saved interval. For example, the pitch module 203 resumes the interval back to third. Step 618 is optional since the reset of the saved interval only occurs after the pitch module 203 modified the interval. The tracking module 207 advances 620 to a next level. For example, the tracking module 207 advances to a next lesson where the interval is decreased and the pitch discrimination becomes more challenging. Examples of graphic representation for the method 600 are depicted in FIGS. 13A and 13B.

Figure 7:
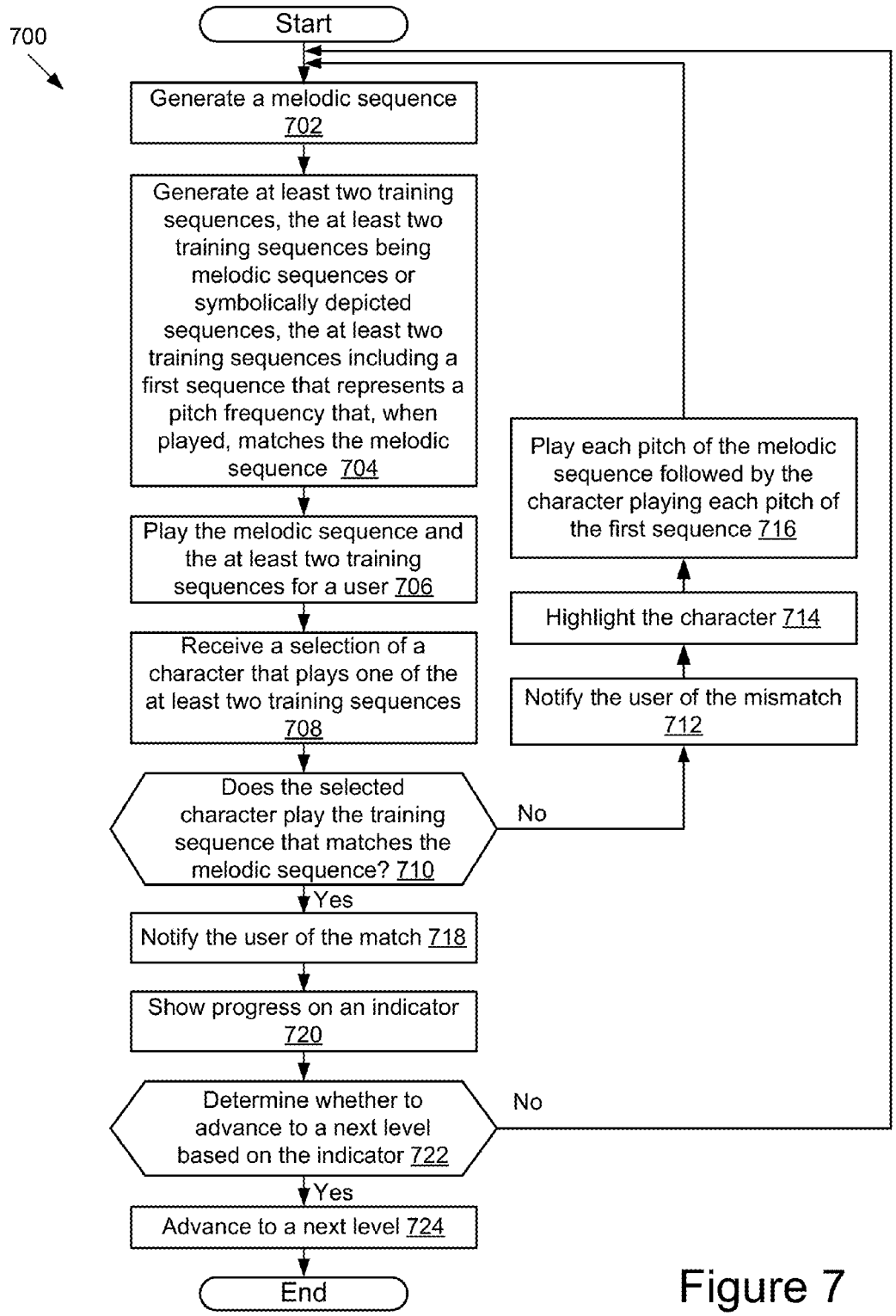

FIG. 7 includes a flowchart of an example method 700 for using a training application 103 to teach a user to discriminate and match musical pitch. The training application 103 includes a routine module 201, a pitch module 203, an execution module 205, a tracking module 207, a determining engine 209, a notification module 211 and a user interface engine 217.

The pitch module 203 generates 702 a melodic sequence. The pitch module 203 also generates 704 at least two training sequences, the at least two training sequences being melodic sequences or symbolically depicted sequences, the at least two training sequences including a first sequence that represents a pitch frequency that, when played, matches the melodic sequence. The execution module 205 plays 706 the melodic sequence and the at least two training sequences for a user. The execution module 205 plays each of the two training sequences as if a character played the sequences. The tracking module 207 receives 708 a selection of a character that plays one of the at least two sequences from the user and transmits the selection to the determining engine 209.

The determining engine 209 determines 710 whether the selected character plays the training sequence that matches the melodic sequence (e.g., the first sequence). If not match, the notification module 211 notifies 712 the user of the mismatch. For example, the notification module 211 generates a spoken admonition for the user to notify the incorrect selection. The user interface engine 217 generates graphical data that highlights 714 the character on a user interface presented to the user and the execution module 205 plays 716 each pitch of the melodic sequence followed by the character playing each pitch of the first sequence. If there is a match, the notification module 211 notifies 718 the user of the match. The tracking module 207 shows 720 progress on an indicator. The determining engine 209 determines 722 whether to advance to a next level based on the indicator. If there is not enough progress, the method 700 moves to step 702 and the routine repeats with a different combination of sequences. Otherwise, the tracking module 207 advances 724 to a next level. Examples of graphic representations for the method 700 are depicted in FIGS. 16A and 16B.

In the following description, for purposes of explanation, numerous specific details are set forth in order to provide a thorough understanding of the specification. It will be apparent, however, to one skilled in the art that the technology can be practiced without these specific details. In another embodiment, structures and devices are shown in block diagram form in order to avoid obscuring the description. For example, the specification is described in one embodiment above with reference to user interfaces and particular hardware. However, the description applies to any type of computing device that can receive data and commands, and any peripheral devices providing services.

Reference in the specification to "some instances" or "an instance" means that a particular feature, structure, or characteristic described in connection with the instance is included in at least some instances of the description. The appearances of the phrase "in one embodiment" in various places in the specification are not necessarily all referring to the same instance.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware instances, an entirely software instance or instances containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for teaching a user to discriminate and match musical pitch comprising:
   generating, with one or more processors, a first melodic sequence for the user;
   generating, with the one or more processors, at least two symbolically depicted sequences including a first symbolic sequence that represents a pitch frequency that, when played, matches the first melodic sequence;
   receiving a selection of the first symbolic sequence; and
   advancing to a next level in response to receiving the selection of the first symbolic sequence.

2. The method of claim 1, wherein the first melodic sequence corresponds to a musical instrument.

3. The method of claim 1, wherein the at least two symbolically depicted sequences include sequences that correspond to multiple instruments.

4. The method of claim 1, further comprising generating a game and providing the user with access to the game.

5. The method of claim 1, further comprising:
   receiving a selection of a second symbolic sequence that fails to match the first melodic sequence; and
   transmitting a notification to the user that the selection of the second symbolic sequence is incorrect.

6. The method of claim 1, wherein advancing to the next level includes unlocking an instrument for the user to play.

7. The method of claim 1, wherein advancing to the next level includes at least one of generating a game and unlocking an instrument and further comprising generating a graphical representation of a trophy that corresponds to the game or the instrument.

8. A system for teaching a user to discriminate and match musical pitch comprising:
   one or more processors;
   a pitch module stored on a memory and executed by the one or more processors, the pitch module for generating at least two symbolically depicted sequences including a first symbolic sequence that represents a pitch frequency that, when played, matches the first melodic sequence; and
   a tracking module stored on the memory and executed by the one or more processors, the tracking module for receiving a selection of the first symbolic sequence and advancing to a next level in response to receiving the selection of the first symbolic sequence.

9. The system of claim 8, wherein the first melodic sequence corresponds to a musical instrument.

10. The system of claim 8, wherein the at least two symbolically depicted sequences include sequences that correspond to multiple instruments.

11. The system of claim 8, further comprising a game module stored on the memory and executable by the one or more processors, the game module for generating a game and providing the user with access to the game.

12. The system of claim 8, further comprising a notification module stored on the memory and executable by the one or more processors, the notification module for notifying the user that a selection of a second symbolic sequence is incorrect responsive to receiving the selection of the second symbolic sequence that fails to match the first melodic sequence.

13. The system of claim 8, further comprising an execution module stored on the memory and executable by the one or more processors, the execution module for unlocking an instrument for the user to play.

14. The system of claim 8, wherein advancing to the next level includes at least one of generating a game and unlocking an instrument and further comprising generating a graphical representation of a trophy that corresponds to the game or the instrument.

15. A computer program product comprising a non-transitory computer usable medium including a computer readable program, wherein the computer readable program when executed on a computer causes the computer to:
   generate a first melodic sequence for a user;
   generate at least two symbolically depicted sequences including a first symbolic sequence that represents a pitch frequency that, when played, matches the first melodic sequence;
   receive a selection of the first symbolic sequence; and
   advance to a next level in response to receiving the selection of the first symbolic sequence.

16. The computer program product of claim 15, wherein the first melodic sequence corresponds to a musical instrument.

17. The computer program product of claim 15, wherein the at least two symbolically depicted sequences include sequences that correspond to multiple instruments.

18. The computer program product of claim 15, wherein the computer readable program when executed on the computer further causes the computer to generate a game and provide the user with access to the game.

19. The computer program product of claim 15, wherein the computer readable program when executed on the computer further causes the computer to:
   receive a selection of a second symbolic sequence that fails to match the first melodic sequence; and
   transmit a notification to the user that the selection of the second symbolic sequence is incorrect.

20. The computer program product of claim 15, wherein the computer readable program when executed on the computer further causes the computer to advance to the next level by unlocking an instrument for the user to play.

* * * * *